Aug. 16, 1938.  T. H. SCHOEPF ET AL  2,127,429
BRAKING
Filed March 1, 1937  6 Sheets-Sheet 1
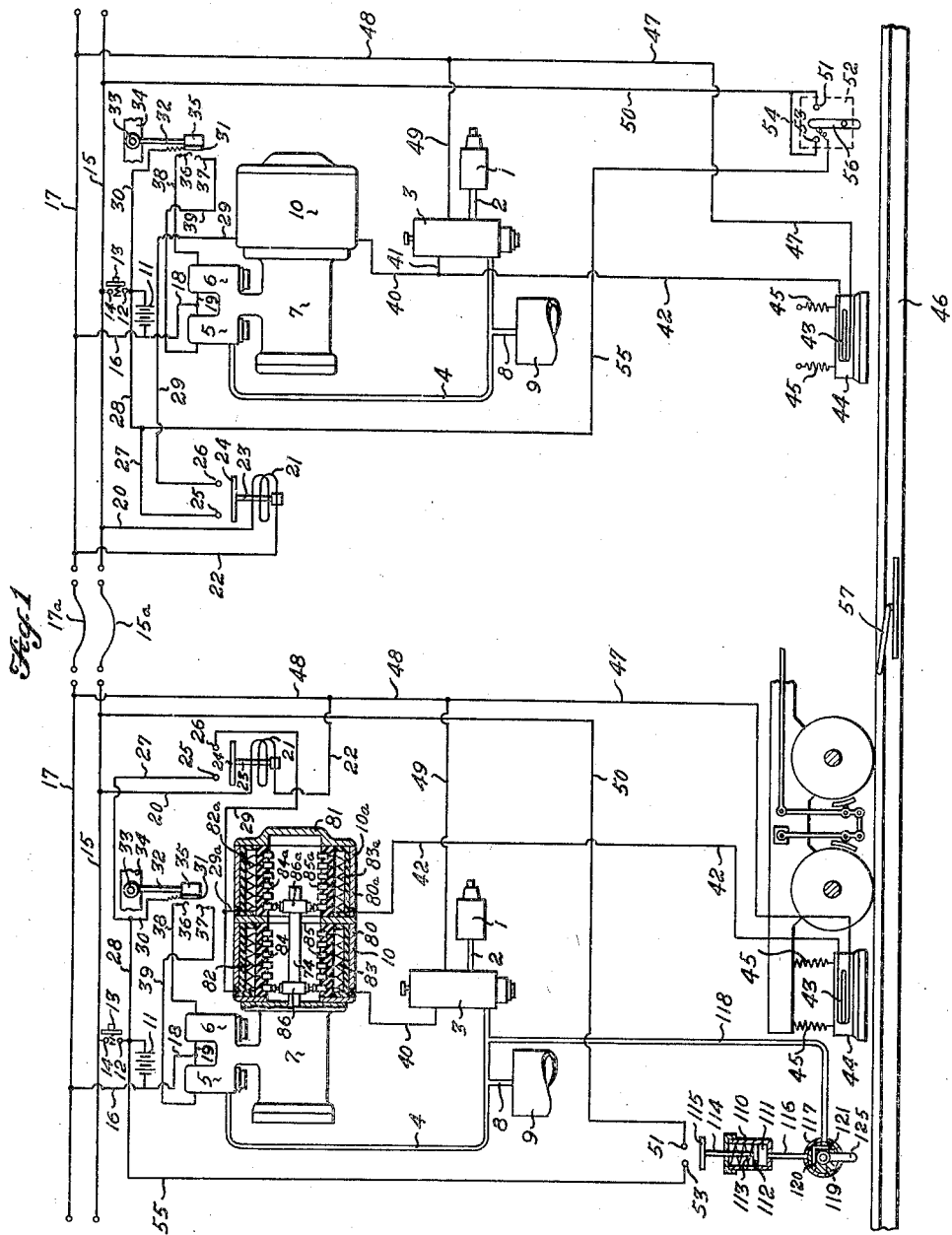
Fig.1
INVENTORS
THEODORE H. SCHOEPF
DAVID M. RITCHIE
BY
ATTORNEYS

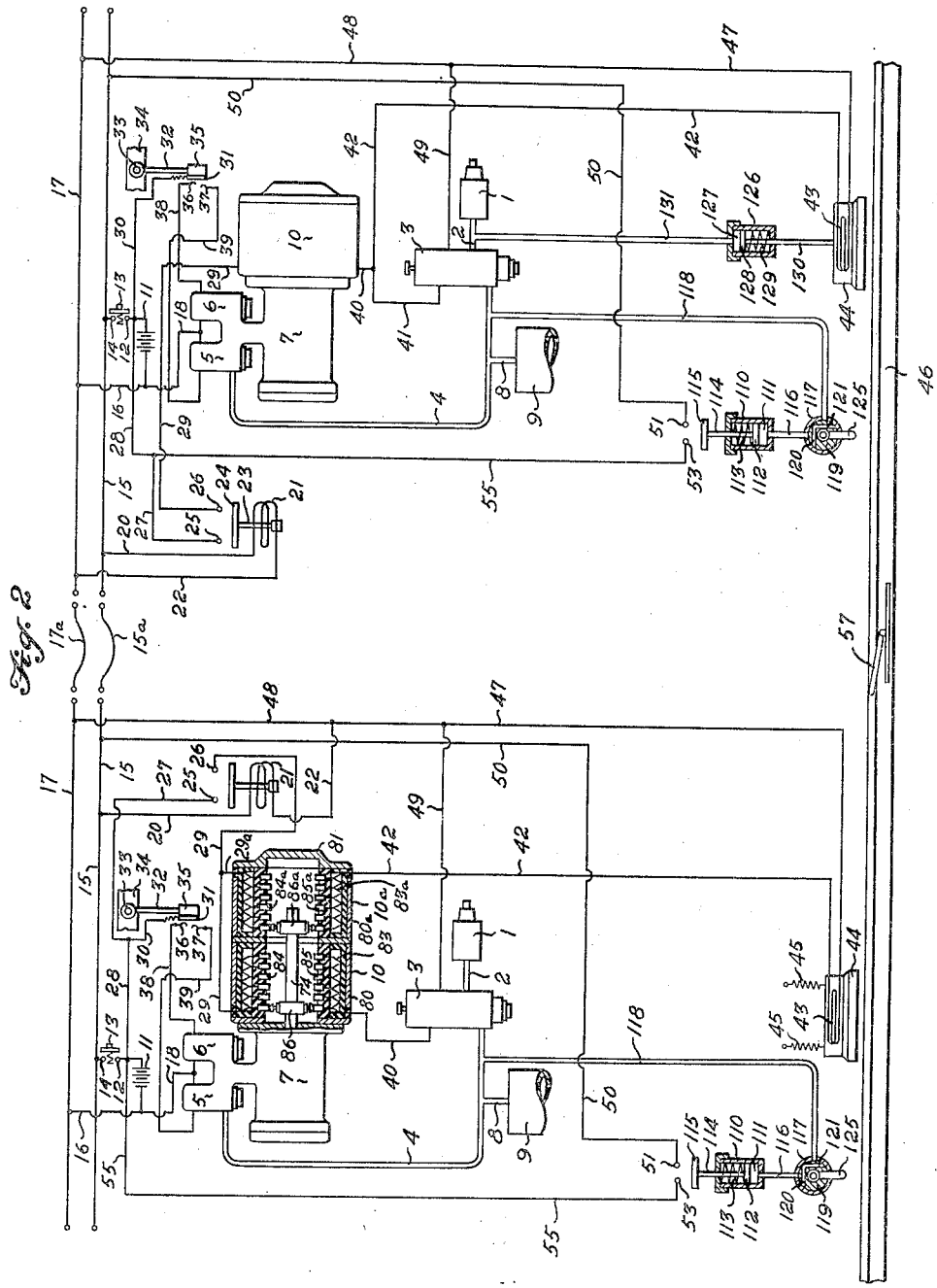

Aug. 16, 1938.    T. H. SCHOEPF ET AL    2,127,429
BRAKING
Filed March 1, 1937    6 Sheets-Sheet 3
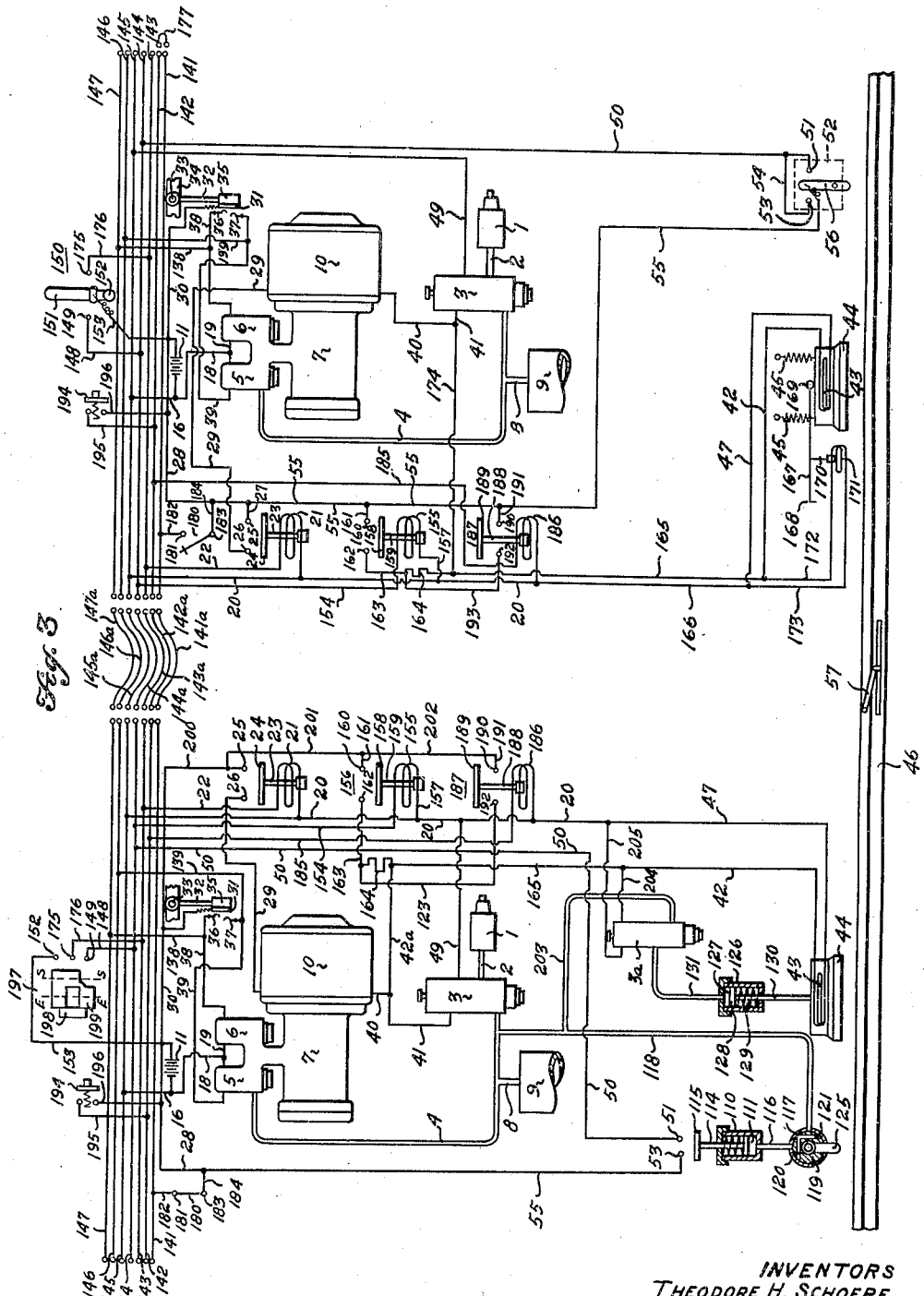
INVENTORS
THEODORE H. SCHOEPF
DAVID M. RITCHIE
BY
ATTORNEYS

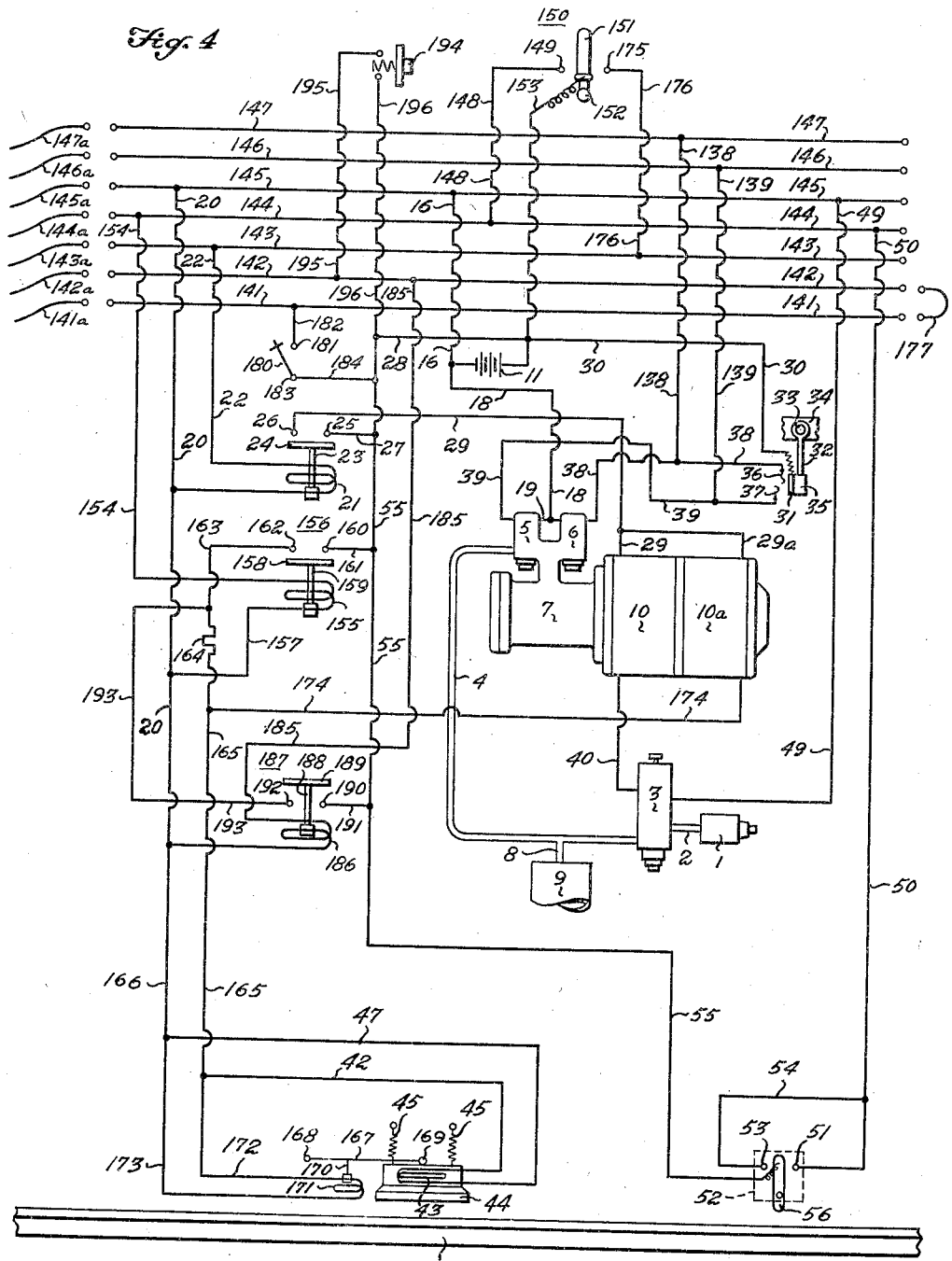

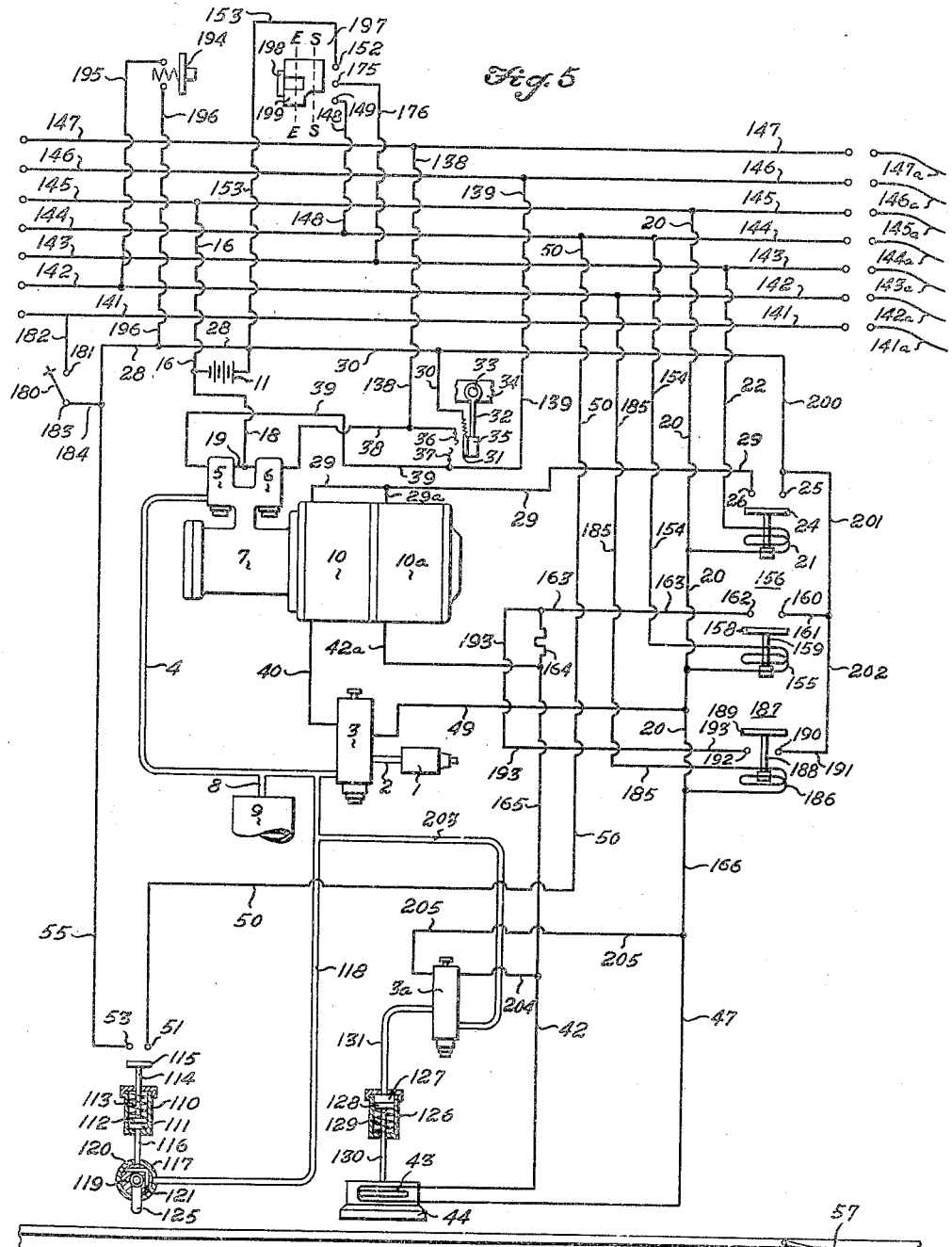

Aug. 16, 1938.  T. H. SCHOEPF ET AL  2,127,429
BRAKING
Filed March 1, 1937    6 Sheets-Sheet 6
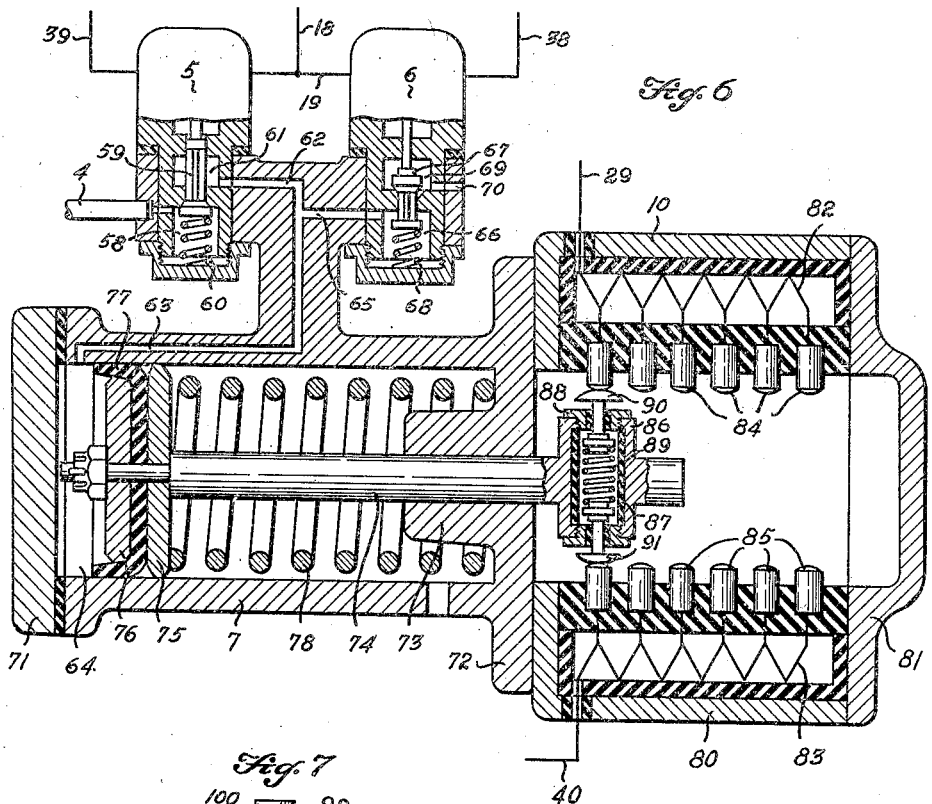
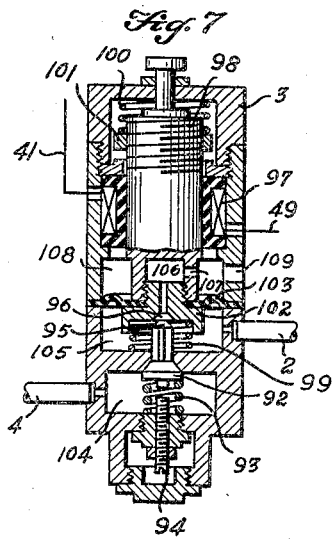
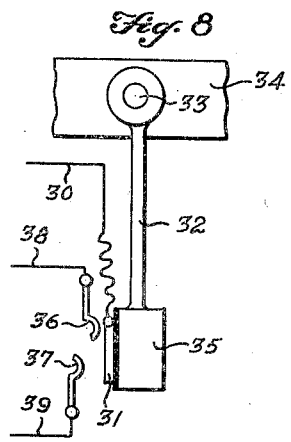
INVENTORS
THEODORE H. SCHOEPF
DAVID M. RITCHIE
BY
ATTORNEYS Patented Aug. 16, 1938

2,127,429

UNITED STATES PATENT OFFICE 2,127,429

BRAKING

Theodore H. Schoepf and David M. Ritchie, Cincinnati, Ohio, assignors to The Cincinnati Traction Building Company, Cincinnati, Ohio, a corporation of Ohio Application March 1, 1937, Serial No. 128,381

24 Claims. (Cl. 303—3)

This invention relates to braking mechanism and particularly to mechanism adapted automatically to control the intensity of application of the wheel and track brakes of a railway vehicle in such manner that the force of application of the respective brakes may be adjusted, during deceleration of the vehicle under the influence of the brakes, in such manner as to compensate for increase of co-efficient of braking friction upon decrease in speed of the vehicle, in order to secure the utmost braking efficiency, while preventing the locking of the vehicle wheels and the skidding thereof on the track rails during brake applications.

It is an object of this invention to provide means for simultaneously applying the wheel and track brakes of a railway vehicle and associated means responsive to the retardation of the vehicle for automatically simultaneously controlling the intensity of application of wheel and track brakes.

It is a further object of this invention to provide means of connection between vehicles in a railway train, whereby application of the wheel and track brakes of one vehicle will cause simultaneous application of the wheel and track brakes of all the vehicles and whereby the intensity of application of the wheel and track brakes of all connected vehicles will be controlled by the actuation of the control means on a single vehicle.

It is a further object of this invention to provide track trip actuated means for causing simultaneous application of the wheel and track brakes of the vehicle, and of all vehicles of the train, at maximum intensity which is thereafter adjusted by the control means in order to compensate for increase of co-efficient of braking friction during vehicle retardation.

It is a further object of this invention to provide means for manually causing simultaneous application of the wheel and track brakes of the vehicle at predetermined intensity which is thereafter automatically controlled by the control means to compensate for increase in co-efficient of braking friction due to retardation.

It is a further object of this invention to provide such manual means on one or more of the vehicles connected in a train whereby application of all the train brakes may be achieved by operation of a single manual means.

It is a further object of this invention to provide means responsive to parting of the train vehicles to cause automatic emergency application of all train brakes, both track and wheel.

It is a further object of this invention to provide manually operable means for making said last-named means inoperative during the removal of a vehicle from the train and subsequent shunting thereof.

It is a further object of this invention to provide, on one of the connected vehicles of a train, manual means, selectively operable to cause simultaneous application, either service or emergency, of the wheel and track brakes of all vehicles connected in the train.

It is a further object of this invention to provide, in such means, means for simultaneously controlling the intensity of application of the wheel and track brakes of a vehicle.

It is a further object of this invention to provide means for simultaneously controlling the intensity of application of all wheel and track brakes of all connected vehicles in a train.

It is a further object of this invention to provide such means for so controlling the wheel and track brakes that they are both applied at maximum intensity, and the intensity of application of both is thereafter simultaneously reduced at a rate proportional to the rate of retardation of the vehicle, or of the train.

It is a further object of this invention to provide such means for so controlling the wheel and track brakes that they are both applied at maximum intensity and the intensity of application of both is then reduced at different rates, at least one of which is proportional to the rate of retardation of the vehicle, or of the train.

It is a further object of this invention to provide such means for so controlling the wheel and track brakes that the wheel brakes are applied initially with maximum intensity and the track brakes with predetermined minimum intensity and the intensity of application of the wheel brakes is thereafter reduced concurrently with increase of intensity of application of the track brakes, the rates of increase and decrease being proportional to the rate of retardation of the vehicle, and/or train.

It is a further object of this invention to provide means for causing emergency application of both wheel and track brakes of a vehicle and/or train; by parting of a vehicle from another connected vehicle in the train; by actuation of a track trip switch on a vehicle by a track trip mechanism; or manually, by manipulation of emergency brake applying means on the vehicle, the brake application being independent of the retardation responsive control means, and the brakes of the vehicle and/or train being applied at maximum intensity.

These and other objects and advantages will appear from the following description taken in connection with the drawings.

It is known that the co-efficient of friction between the shoe of a friction wheel brake increases as the speed of the vehicle decreases under the influence of the applied vehicle brakes. Therefore, where the wheel brakes are initially applied at maximum intensity, it is desirable to thereafter decrease the intensity or force of application of the brake shoe to the wheel in order to prevent locking of the vehicle wheels and sliding thereof on the supporting track rails. According to the principles of this invention, this is accomplished by inertia responsive pendulum means which reduces the intensity or force of application of the wheel shoes to the wheels at a rate proportional to the rate of the above-explained increase of co-efficient of brake friction.

In addition, according to the principles of this invention, the track brakes are applied simultaneously with the application of the wheel brakes. The wheel brakes are initially applied at maximum intensity or with maximum force, while the track brakes are initially applied, either at maximum intensity or at predetermined minimum intensity, and the intensity of track brake application is thereafter either decreased or increased at a rate which is preferably proportional to the rate of decrease of intensity in wheel brake application, which latter rate is proportional to the rate of increase of co-efficient of braking friction.

While it is desirable, in some cases, that both wheel and track brakes be initially applied at maximum intensity and the intensity of application thereof be simultaneously progressively diminished; in other cases, it is preferred that the wheel brakes be initially applied at maximum intensity and the intensity thereof be thereafter progressively decreased, while the track brakes are initially applied at predetermined minimum intensity and the intensity of application thereof be thereafter progressively increased simultaneously with the decrease of intensity of application of the wheel brakes. In this latter case, the utmost braking efficiency is achieved without sliding of the wheels on the tracks, because the track brakes, in their operation, are not susceptible to various factors which influence the wheel brakes because of the direct application of the track brakes to the track rails in contrast to the application of the wheel brakes to the wheels of the vehicle, whereby the braking effect thereof is dependent upon the existence of traction between the vehicle wheels and the railway tracks.

By controlling the intensity of application of the wheel and track brakes in the above manner the track brakes in operation, draw the wheels down against the rail and thus increase traction between wheels and rail whereby the utmost braking efficiency is achieved as well as the utmost smoothness of operation of the vehicle or train during deceleration thereof upon application of the wheel and track brakes. During emergency brake applications, where smoothness and comfort must be sacrificed in the interest of safety, it is preferred that both wheel and track brakes be initially applied at maximum intensity and that the intensity of application thereof remain at its maximum value until the vehicle or train is brought to a stop.

Accordingly, we have provided means for accomplishment of the above objects and advantages, which means, along with their mode of operation, is hereinafter more clearly described.

In the drawings:

Figure 1 is a diagrammatic view illustrating the application of the principles of our invention to two vehicles of a train, and illustrating the means of connection between the respective mechanisms on the vehicles, different embodiments of our invention being shown as applied to the respective vehicles;

Figure 2 is a view similar to Figure 1, but showing the application of other embodiments of our invention to two connected vehicles of a railway train;

Figure 3 is a view similar to Figure 2, but illustrating the application to two connected vehicles of a railway train other differing embodiments of our invention;

Figure 4 is an enlarged diagrammatic view similar to Figure 3, showing the application to a single vehicle of an embodiment of our invention similar to that embodiment illustrated at the right of Figure 3, but differing slightly therefrom;

Figure 5 is a view similar to Figure 4, showing the application to a single vehicle of an embodiment of our invention broadly similar to that illustrated at the left of Figure 3, but varying slightly therefrom;

Figure 6 is an elevational view, partly in section, of a preferred type of biasing rheostat and combined actuating air engine and electrically controlled inlet and outlet valve devices;

Figure 7 is an elevational view, in section, of a preferred form of self-lapping electro-pneumatic valve device which is adapted to be controlled by the biasing rheostat illustrated in Figure 6 for controlling the flow of fluid to the wheel brake cylinder; and Figure 8 is an elevational view, partly diagrammatic, illustrating a preferred form of retardation responsive control means for controlling the inlet and outlet valves of the biasing rheostat actuating air engine illustrated in Figure 6.

Referring to the drawings in detail, with reference particularly to Figure 1, the equipment of two cars or vehicles of a railway train is illustrated, the equipment of the respective cars or vehicles being different in various details, as will hereinafter appear. In Figure 1, the wheel brake cylinders are designated 1 and are connected by means of pipe 2 to the self-lapping electro-pneumatic valve device 3. The source of fluid pressure comprising the reservoir 9 is connected by branch pipe 8 to the pipe line 4. The pipe line 4 is connected at one end to the self-lapping electropneumatic valve device 3 and at the other end to the supply valve 5 of the biasing rheostat operating air engine 7. The air engine 7 is also provided with a release valve 6.

The air engine 7 is adapted to operate the biasing rheostat 10, the details of which air engine 7, supply valve 5, release valve 6 and biasing rheostat are illustrated in Figure 6 of the drawings. Each vehicle is provided with a suitable source of electric power 11, such as a storage battery, having the positive side thereof connected to the terminal 12 of the manually operable switch 13 which has the opposite terminal 14 thereof connected to the train wire branch 15. The switch 13 is a two-point make type normally held open by a spring. The opposite side of the source of power 11 is connected by means of branch wire 16 to the train wire branch 17 and by the branch wire 18 to the wire 19 which is connected between terminals of the energizing solenoids of the valves 5 and 6. In the righthand vehicle shown in Figure 1, the train wire branch 15 is connected by means of wire 20 to one terminal of the solenoid 21, while the other terminal of the solenoid 21 is connected by means of wire 22 with the train wire branch 17.

The solenoid 21 cooperates with the armature 23 of a circuit closer having a switch plate 24 which is adapted, upon energization of the solenoid 21, to engage and bridge the switch contacts 25 and 26. The switch contact 25 is connected by means of wire 27 with the wire 28 which is connected to the positive side of the source of power 11. The switch contact 26 is connected by means of wire 29 with one terminal of a resistance in the rheostat 10. The positive terminal of the source of power 11 is also connected by means of wire 30 with the contact 31 of the retardation controller 32, the details of which are illustrated in Figure 8 of the drawings.

As shown in Figure 8, the retardation controller 32 is pivotally supported on a pin or the like 33 which is mounted on a suitable portion 34 of the vehicle, while the lower end thereof is provided with an enlarged and weighted head 35 to which is rigidly secured and insulated therefrom the contact 31. When the retardation controller swings to the left or in clockwise direction, as seen in Figure 8, it is adapted to cause engagement of the contact 31 with the stationary contact 36 and the stationary contact 37, as will hereinafter more clearly appear. The stationary contact 36 is connected by means of wire 38 with a terminal of the solenoid of release valve 6, which solenoid has its other terminal connected to the cross wire 19. The stationary contact 37 is connected by means of wire 39 to one terminal of the solenoid of the supply valve 5, which solenoid has its other terminal connected to the cross wire 19.

Suitably connected to a terminal of the rheostat 10, opposite the terminal which is connected to the wire 29, is the wire 40 which is connected by means of the branch wire 41 to one terminal of the winding of the self-lapping electro-pneumatic valve device 3. The wire 40 is also connected by means of wire 42 with one terminal of the coil 43 of the brake shoe 44, which brake shoe is supported by springs 45 sufficiently close to the rail 46 as to place the rail within its magnetic field upon energization thereof. The terminal of the brake coil 43, which is opposite that terminal to which the wire 42 is connected, is connected by means of wire 47 to the wire 48 which is connected to the train wire branch 17. The wire 48 is also connected by means of wire 49 to that terminal of the winding of the valve device 3 which is opposite the terminal which is connected to the wire 41.

The train wire branch 15 is connected by means of wire 50 with the contact 51 of the electric track trip switch 52. The wire 50 is also connected by means of wire 54 with the trip contact 53. The wire 28 which is connected to the positive side of the source of power 11 is also connected by means of wire 55 with the switch lever 56 of the electric track trip switch 52. Switch lever 56 of the track trip switch 52 is normally biased in neutral position, as shown in Figure 1, but is adapted to be engaged with either the contact 51 or the contact 53 upon engagement with the trip device 57, when it is properly set for engagement with the switch lever 56 of the electric track trip switch 52.

With reference to Figure 6, the position of parts of valves 5 and 6 of air engine 7 and rheostat 10 are shown in the position assumed by them when the switch 13 is open and the brake applying mechanism is de-energized. It will be seen that the pressure chamber 58 of the valve 5, which is always in communication with the fluid pressure in the pipe 4, is closed by the valve member 59 which, when the solenoid of the valve 5 is de-energized, is urged upwardly by the spring 60 in the pressure chamber 58. The valve 5 is provided with an intermediate chamber 61 which is connected by means of the branch 62 with the conduit 63 which leads to the left-hand end of the cylinder 64 of the air or fluid engine 7. Upon energization of the solenoid of the supply valve 5, the valve member 59 is urged downwardly against pressure of the spring 60 to provide communication between the pressure chamber 58 and intermediate chamber 61, whereby fluid under pressure passes from the pipe 4 through pressure chamber 58 to intermediate chamber 61 and thus through branch 62 and conduit 63 to the left-hand end of the cylinder 64.

The pressure chamber 66 of the release valve 6 is connected by means of the branch 65 with the conduit 63. The valve member 67, during de-energization of the solenoid of the release valve 6, is urged upwardly by the spring 68 in the pressure chamber 66, whereby to provide communication from left-hand end of the cylinder 64, through conduit 63 and branch 65 to pressure chamber 66 and thence through intermediate chamber 69 and exhaust port 70 of the release valve 6 to the atmosphere. Thus, when the solenoids of the supply valve 5 and release valve 6 are both de-energized, pressure from the pipe 4 is prevented by valve member 59 from entering the intermediate chamber 61 of the supply valve 5, while at the same time pressure is released from the left side of the cylinder 64, whence it escapes through conduit 63, branch 65 and chambers 66 and 69 of release valve 6, through exhaust port 70 to the atmosphere.

In the operation of the apparatus, the release valve 6 is closed by energization of its solenoid before or substantially simultaneously with energization of the solenoid of the supply valve 5, which causes fluid pressure to be introduced from the pipe 4 through the supply valve 5 to the left-hand end of cylinder 64. The means for accomplishing the energization of the respective solenoids has been described above and the operation thereof will be hereinafter described in detail. The lefthand end of the cylinder 64 is closed by a suitable cap 71, while the righthand end is provided with flanges 72 and bearing boss 73 having therein a suitable aperture to slidably receive the piston rod 74 which is provided at its left end with a suitable fluid piston comprising metallic disks 75 and 76 having the resilient cup washer 77 clampingly secured therebetween. A compression spring 78 has one end in engagement with the disk 75 and the other end in engagement with the righthand end wall of the cylinder 64. This compression spring constantly urges the piston rod 74 toward the left. The above described parts comprise the rheostat operating fluid engine.

The rheostat comprises a cup-shaped casting 80 suitably secured to the flanges 72 of the fluid engine and having at its right end the closure cap 81. Suitably tapped resistance elements 82 and 83 are secured in the member 80 and are suitably insulated from the walls thereof. The taps of the resistance element 82 are connected to contacts 84 which extend radially inwardly. Opposite these contacts 84 are similar contacts 85 which are connected to the respective taps of the resistance element 83. Resistance elements 82 and 83 may be tapped at any suitable intervals which may be equal or unequal.

The piston rod 74 is provided at its right end with a movable contact member 86 comprising an oppositely extending cylindrical member provided with suitable insulation 87 and having an end cap 88 at each end. The end caps are screw-threaded into the ends of the member 86 and are each provided with a central aperture having suitable insulation, which slidably receives contacts which are urged by the central compression spring 89. The uppermost contact which is adapted to engage the contacts 84 is designated 90, while the lower contact is designated 91. Electrical connection between the contact 90 and contact 91 is provided by the spring 89.

In the position illustrated in Figure 6, the wire 29 is connected with the wire 40 through the leftmost contact 84, contact 90, spring 89, contact 91 and leftmost contact 85. No resistance is inserted between the wires 29 and 40 in this position of parts. When, however, pressure is introduced in the lefthand end of the cylinder 64, the piston rod 74 is moved to the right to engage the contacts 90 and 91 with other contacts 84 and 85, whereby to insert between the wires 29 and 40 an amount of resistance depending upon the resistance between the respective taps and depending also upon the excess of pressure in the lefthand end of the cylinder 64 over the pressure of the spring 78.

In the modified form of rheostat illustrated at the left sides of Figures 1 and 2, the piston rod 74 is provided with a pair of spaced members 86 and 86a which are identical and which cooperate in the same manner with contacts 84 and 85 and with contacts 84a and 85a respectively of the resistance elements 82, 83 and 82a, 83a respectively, which resistance elements are placed in tandem. The resistance element 82a is similar to and in alignment with the resistance element 82, while the resistance element 83a is likewise similar to and in alignment with the resistance element 83. The arrangement is such that, upon movement of the piston rod 74 to the right, the members 86 and 86a progressively bridge opposite contacts 84, 85 and 84a, 85a to insert differing amounts of resistance between the wires connected to resistance elements 82, 83 and resistance elements 82a and 83a respectively.

In the arrangement illustrated at the left of Figure 1, progressively increasing resistances are inserted between the wires connected to each of the rheostats 10 and 10a, which resistances are proportional to the pressure in the left end of cylinder 64. In the arrangement illustrated at the left in Figure 2, the connection of wiring is such that increasing pressure in the air engine 7 increases the resistance inserted between the wires connected to the rheostat 10, while decreasing the resistance inserted between the wires connected to the rheostat 10a.

The details of the self-lapping valve device 3 are shown in Figure 7. The valve device 3 is provided with a supply valve 92 which controls the flow of fluid under pressure from the reservoir 9 through pipe 4 and pipe 2 to the brake cylinder 1. The supply valve 92 is urged toward seating position by the spring 93, and limitation of the downward movement thereof is accomplished by suitable adjustment of the adjusting screw 94. The upper end of the valve member 92 is tapered at 95 for engagement with a release valve seat 96 to control the release of fluid under pressure from the pipe 2 which is connected to the brake cylinder 1. The upper part of the valve device 3 includes an electromagnet having a winding 97, referred to above, having one terminal connected to the wire 41 and the other terminal connected to the wire 49. This winding cooperates, when energized, to urge the core member 98 downwardly against pressure of the spring 99 which constantly urges it upwardly and which spring is opposed by the spring 100 which engages the collar 101 which is screw threaded on the core 98. The lower end of the core member 98 is screw-threadedly secured to the cup member 102 which has the release valve seat 96 formed therein.

A diaphragm 103 is secured between the cup member 102 and the core member 98 at its central portion and has the outer annual edge portions thereof secured between portions of the casing of the valve device 3. The pipe 4 communicates with the lower or pressure chamber 104, in which the spring 93 is disposed and which is adapted to communicate, when the valve member 92 is in downward position, with the intermediate chamber 105 of the valve device to which is connected the pipe 2. The lower end of the core member 98 is provided with a chamber 106 which communicates through the axial port 107 with the exhaust chamber 108. The exhaust chamber is provided with a port 109 which provides constant communication between the exhaust chamber 108 and the atmosphere.

A passageway is provided through the cup member 102 from the release valve seat 96 to the chamber 106. The tension of the springs 93, 99 and 100 is such that, when the winding 97 is de-energized, the parts of the valve device 3 are in the position illustrated in Figure 7. In this position, the valve device 3 provides means of communication between the brake cylinder 1 and pipe 2 to the atmosphere. Upon energization of the winding 97, the core 98 is urged downwardly to engage the release valve seat 96 with the tapered surface 95 of the valve member 92 to block off the chamber 106 from the chamber 105 and also cause the valve member 92 to be urged downwardly against pressure of spring 93 to provide means of communication from pipe 4 through chamber 104 and chamber 105 to the pipe 2 and brake cylinder 1. The downward displacement of the core member 98 is proportional to the energization of the winding 97. The intensity of energization of the winding 97 is controlled by means of the rheostat 10, by insertion of resistance in the energizing circuit of the winding 97.

When, through actuation of the rheostat 10, the amount of resistance in the circuit is increased, the downward displacement of the core member 98 is decreased and the fluid pressure in the brake cylinder 1 is decreased, the pressure in the brake cylinder 1 being thus controlled in inverse ratio with respect to the resistance inserted by the rheostat 10 between wires 29 and 40 connected thereto. By this means, the intensity of wheel brake application may be controlled, because reduction of the intensity of the energization of the winding 97, through operation of the rheostat 10, will cause reduction of pressure in the brake cylinder 1.

Operation

*Figure 1, right.*—When the parts are in the position illustrated in Figure 1, the winding of the valve device 3 is de-energized and the brake cylinder 1 communicates with the atmosphere. The coil 43 of the track brake 44 is also de-energized. If the manual switch 13 is closed, a circuit will be completed from one side of the source of power 11 through switch 13, train wire branch 15, wire 20, through solenoid 21, wire 22, train wire branch 17, and wire 16 to the opposite side of the source of power 11. This will energize the solenoid 21, whereby to place the switch plate 24 in bridging engagement with the contacts 25 and 26. A circuit is then completed from one side of the source of power 11 through wire 28, wire 27, contact 25, switch plate 24, contact 26, wire 29, through the resistances of rheostat 10 to wire 40, through wire 41 to the winding of the valve device 3, and from the winding through wires 49 and 48 to train wire branch 17, and thence through train wire branch 17 and wire 16 to the opposite side of the source of power 11. This circuit causes energization of the winding of the valve device 3.

Simultaneously, a circuit is completed from energized wire 40 to wire 42, through brake coil 43 and wire 47 to energized wire 48, whereby to cause energization of the brake coil 43 simultaneously with the energization of the winding of the valve device 3. Due to the fact that the valves 5 and 6 were originally de-energized, the piston rod 74 of the air engine is in its leftmost position, whereby the intensity of energization of the winding of valve device 3 is at its utmost value. The pressure supplied to the cylinder 1 is likewise most intense and the ultimate intensity of the energization of the brake coil 43 is likewise secured due to the fact that the rheostat 10 inserts no resistance between the wires 29 and 40.

One side of the source of power 11 is connected by wire 30 to the contact 31 of the pendulum retardation controller 32, while the other side of the source of power is connected by wire 18 to the wire 19 which is connected to the coils of the respective valves 5 and 6. The opposite terminal of the coil of valve 5 is connected by means of wire 39 with the stationary contact 37, while the opposite terminal of the coil of valve 6 is connected by means of wire 38 with the stationary contact 36. Therefore, upon retardation of the vehicle due to application of the wheel brakes by the cylinder 1 and due to application and energization of the rail brake 44, the contact 31 of the controller 32 will engage the stationary contact 36 to complete a circuit between one side of the source of power 11 through wire 30, contact 31, contact 36, wire 38, to coil of the release valve 6, from the coil of the relief valve to wire 18 to the opposite side of the source of power 11. This closes the release valve 6.

Upon further movement of the controller 32, the contact 31, which still engages the contact 36 and retains the release valve 6 closed, also engages the stationary contact 37. This engagement completes a further circuit from one side of the source of power 11 through wire 30, contact 31, contact 37, wire 39, coil of valve 5, wire 19, and wire 18 to the opposite side of the source of power 11. This opens the supply valve 5, whereby to introduce fluid under pressure from the reservoir 9 through branch pipe 5 and pipe 4 to the cylinder of the air engine 7. This causes the insertion of resistance in the energizing circuit for the valve device 3 and for the coil 43 of the track brake 44.

The engagement of the contact 31 with the contact 37 will be intermittent whereby, upon increase of the rate of retardation of the vehicle, pressure in the cylinder of the air engine will increase to increase the amount of resistance inserted between the wires 29 and 40 by the rheostat 10. The increase of resistance causes decrease of the intensity of energization of the winding of the valve device 3, whereby to effect intermittent release of fluid pressure from the brake cylinder 1, while at the same time gradually reducing the intensity of the energization of the brake coil 43. As a result, the vehicle will be brought smoothly to a stop without causing the wheels of the vehicle to slide on the rails of the track.

The above operation was accomplished through the manual closing of the manual switch 13 which is suitably located on the vehicle. Emergency brake applying means is also provided for operation of the braking mechanism by a track trip device 57 when placed in operative position. When this device is placed in operative position, it is disposed in the path of the switch lever 56 on the moving vehicle. Upon the passage of the lever 56 past the track trip 57, in either direction, the switch lever 56 will be thrown either to the left or to the right to engage either the contact 53 or contact 51 to connect the wires 50 and 55. This completes a circuit from one side of the source of power 11 through wire 28 and wire 55, through switch lever 56 to wire 50, through train wire branch 15, through wire 20, through solenoid 21, wire 22, train wire branch 17 and wire 16 to the opposite side of the source of power 11. This causes energization of the solenoid 21 to cause operation of the circuit closer in such manner that the switch plate 24 will bridgingly engage the contacts 25 and 26 of the circuit closer to cause operation of the mechanism in the above-described manner.

Attention is particularly directed to the fact that one side of the source of power is connected by means of the wire 16 to the train wire branch 17 and that, when the train wire branch 15 is connected in any manner whatsoever with the opposite side of the source of power 11, a circuit is completed through wires 20 and 22 to energize the solenoid 21 of the circuit closer. Upon energization of the solenoid 21, the circuit closer causes operation of the mechanism.

In the form of our invention illustrated at the left of Figure 1, a rheostat 10a is provided in tandem with the rheostat 10 for separate control of the intensity of energization of the coil 43 of the track brake 44 simultaneous with the control of the energization of the winding of the valve device 3. The rheostat 10a is provided with tap resistance elements 82a and 83a in tandem with the tap resistances 82 and 83 of the rheostat 10, and the resistance elements 82a and 83a have contacts 84a and 85a respectively attached to the taps of the resistance elements 82a and 83a. The piston rod 74 is extended and provided with a second contact member 86a similar to the contact member 86 and disposed with respect to the contacts 84a and 85a in the same manner as is the contact 86 disposed with respect to the contacts 84 and 85.

The left end tap of the resistance element 82a is connected by means of wire 29a with the wire 29, while the lefthand tap of the resistance element 83a is connected directly to the wire 42 which leads to the coil 43 of the brake shoe 44.

The opposite terminal of the coil 43 is connected by means of wire 47 with the wire 48 which leads to the train wire branch 17. The wire 22 which is connected with one terminal of the solenoid 21 is also connected to the wire 48, as is also the wire 49 which leads from one terminal of the winding of the valve device 3, which winding has its other terminal connected by the wire 40 to the left end tap of the resistance element 83. The wire 29 is connected to the lefthand tap of the resistance element 82 in the same maner as in the construction described above. Manual closing of the manual switch 13 on the vehicle, to the left of Figure 1, causes energization of the valve device 3 and of supply valve 5 and release valve 6 in the manner above described to cause application of the wheel brakes by cylinder 1 with initial maximum intensity followed by gradual decrease of the intensity of application, during deceleration, as described above. Simultaneously, the coil 43 of the track brake 44 is energized and the intensity of energization thereof is gradually decreased through operation of the solenoid 10a by the rheostat air operating engine 7 by gradual insertion of increasing amounts of resistance between the wires 29a and 42 through operation of the rheostat 10a.

The values of resistances 82 and 83a may be varied to vary the initial intensity of energization of the track brake coil 43 and likewise the arrangement of the taps of these resistances may be also varied to secure variations in the rate of decrease of intensity of energization during operation of the rheostat 10a by the air engine 7. For the purpose of achieving emergency operation of the braking mechanism from the track trip 57, a modified form of track trip operated switch is provided which comprises the air engine 110 having the cylinder 111 provided with a piston 112 urged downwardly by spring 113, which piston 112 is connected by means of the stem 114 with the switch plate 115. The lower end of the cylinder 111 is connected by means of pipe 116 with the cylindrical casing 117 of the track trip valve. The casing 117 is also connected, by means of the pipe 118, with the pipe 4. The casing 117 is provided with a cylindrical rotor 119 which is rotatable therein and which is provided with ports 120 and 121. At one end, the rotor 119 is provided with the lever 125 which is rigidly secured thereto.

In the position shown in Figure 1, communication between the pipes 116 and 118 is prevented by the rotor 119, but, however, upon rotation of the rotor 119 in clockwise direction through an arc of forty-five degrees, the ends of the pipes 116 and 118 will be connected by the port 120. If the rotor 119 is rotated by the lever 125 in counterclockwise direction through an arc of forty-five degrees, the ends of pipes 116 and 118 will be connected by the port 124. Upon the connection of the pipes 116 and 118, fluid under pressure will flow from the pipe 4 through pipe 18 and one of the ports and through pipe 116 to the cylinder 111. When the pressure in the bottom of the cylinder 111 overbalances the force of the spring 113, the switch plate 115 is placed in engagement with contacts 51 and 53. The swinging movement of the lever 125 of the track trip valve is accomplished by engagement therewith of the track trip device 57 when it is placed in operative position and when the vehicle carrying the track trip valve passes over the device 57 in either direction.

Upon engagement of the switch plate 115 with contacts 51 and 53, a circuit is completed from one side of the source of power 11 through wire 55, contact 53, switch plate 115, contact 51, wire 50, train wire branch 15, wire 20, solenoid 21, wire 22, wire 48, train wire branch 17, and wire 16 to the other side of the source of power 11. This causes the switch plate 24 to be engaged with the contacts 25 and 26 to cause operation of the mechanism in the manner described above.

*Connection of train wire branches into train line.*—The train wire branches 17 of the adjacent cars in the train are adapted to be connected by means of the branch connectors 17a, while similar connection of the train wire branches 15 by branch connectors 15a is also provided. The respective train wire branches 17, therefore, become, in effect, a single train wire and the train wire branches 15 likewise become, in effect, a single train wire, extending the length of the train. Due to the connection of the above described mechanism in such manner that one side of the source of power is constantly connected to the train wire branch 17 by the wire 16, connection of the other side of the source of power 11 with the train wire branch 15 will cause energization of the solenoid 21 of the circuit closer to engage the switch plate 24 with the contacts 25 and 26 to cause operation of the braking mechanism, as described above.

When the respective train wire branches 17 are connected by the branch connector 17a, and the train wire branches 15 are connected by the branch connectors 15a, connection of any source of power 11 between any of the train wire branches 17 and 15 will cause energization of the solenoid 21 not only of the one vehicle, but of each vehicle having the branches 17 connected by connector 17a and the branches 15 connected by the connector 15a. For instance, in Figure 1, the righthand manual switch 13 is closed, a circuit is completed from one side of the source of power 11 on the right vehicle through the adjacent train branch 15, through wire 20, solenoid 21, wire 22, train wire branch 17 and wire 16 to the opposite side of the source of power 11. A parallel circuit extending from the righthand train wire branch 15 through connector 15a, lefthand train wire branch 15, lefthand wire 20, lefthand solenoid 21, lefthand wire 2, lefthand wire 48, lefthand train branch 17, branch connector 17a to the righthand train wire branch 17 is completed. Thus, upon closing any manual switch 13 on a vehicle of a train having its train wire branches connected by branch connectors, each circuit closer in the train will be simultaneously operated to cause operation of the braking mechanism thereon. The actuation of the track trip switch on any vehicle will likewise connect the source of power 11 of that vehicle across the train wire branches 15 and 17 of that vehicle, whereby to likewise cause simultaneous operation of the circuit closers to cause simultaneous operation of the braking mechanism of each vehicle in the train.

While the track brake illustrated in Figure 1 is of the type wherein the shoe 44 is suspended by springs 45 closely adjacent the rail 46, and whereby application is caused by energization of the coil 43 which has the rail 46 within the magnetic field thereof, other types of brakes which are normally suspended above the rail at substantial distance therefrom and which are positioned closely adjacent thereto by means of either an air engine such as is illustrated in Figure 2, or by lever mechanism operated by a solenoid connected in the brake coil energizing circuit as illustrated at the right of Figure 3 may be used.

In the embodiment of our invention shown at the right of Figure 2, the electrical connections are the same as those illustrated at the right of Figure 1, save that, instead of the electrical track trip switch 52, the air engine operated track trip switch, illustrated at the left of Figure 1, is substituted. Also, instead of the form of brake illustrated in Figure 1, the brake 44 illustrated at the right of Figure 2 is of the type which is normally supported a substantial distance from the rail 46 and application thereof is secured by positioning the brake shoe 44 closely adjacent the rail by means of the supporting air engine apparatus 126.

The air engine 126 is provided with a cylinder 127 carrying a reciprocable piston 128 which is constantly urged upwardly therein by means of the spring 129. The piston 128 is connected to the top of the shoe 44 by means of the stem 130. The upper end of the cylinder 127 is connected by means of pipe 131 with the pipe 2, the fluid pressure of which is controlled by the self-lapping valve device 3. The self-lapping valve device 3 is controlled in the same manner as in the form illustrated at the right of Figure 1, described above, the pressure in the cylinder 1 and the cylinder 127 being controlled by the intensity of energization of the winding of the valve device 3.

When the operating circuit is closed manually by operation of the manual switch 13 of any of the cars in the train having their train line branches 15 and 17 connected, as described above, the winding of the valve device 3 receives its maximum energization whereby to supply fluid under maximum pressure to the cylinders 1 and 127. In order that the brake 44 be positioned for application, it is necessary that the pressure in the cylinder 127 exceed the force of the spring 126. The amount of excess pressure regulates the quickness of actuation of the air engine 126 to position the shoe 44 for application. Likewise, when the pressure in the cylinder 127 is reduced below the force of the spring 129, the spring will urge the brake shoe 44 upwardly. The excess in spring pressure over the air pressure in the cylinder 127 will regulate the upward pressure applied to the shoe 44 and, necessarily, the amount of reduction in the force of application of the brake shoe 44, because this upward force will be exerted against the downward force due to energization.

Generally, the strength of the spring is merely such as to withdraw the brake from the rail when pressure is released in the cylinder 127, but it is contemplated that the strength of the spring may be so chosen that a substantial pressure in the cylinder 127 is required to overcome the force thereof and position the shoe for application. The necessity for building up a pressure in the cylinder 127 will then cause delay of application of the shoe to the rail after the operating circuit is closed.

As in the embodiment illustrated at the right of Figure 2, the intensity of energization of the coil 43 of the brake shoe is regulated by the rheostat 10 simultaneously with the regulation of the intensity of energization of the winding of the valve device 3.

In the embodiment of our invention illustrated at the left of Figure 2, the structure is similar to that illustrated to the left of Figure 1, a change in the connection of the wires 29a and 42 to the solenoid 10a is, however, made. The wire 29a is connected to the righthand tap of the resistance element 82a, while the wire 29 is connected to the lefthand tap of the resistance element 82. The wire 42 is connected to the righthand tap of the resistance element 83a, while the wire 40 is connected to the lefthand tap of the resistance element 83. Due to this connection, upon initial energization of the winding of the valve device 3 and of the coil 43 of the brake, no resistance will be inserted between the wires 29 and 40 by the rheostat 10, while the ultimate amount of resistance will be inserted between the wires 29a and 42 of the brake coil energizing circuit.

Movement of the piston rod 74 to the right by the air engine 7, during operation, as described above, will cause resistance to be progressively inserted in the energizing circuit of the winding of the valve device 3, while the resistance inserted between wires 29a and 42 of the brake energizing circuit will be progressively reduced. In other words, decrease of the intensity of energization of the valve device 3 is accompanied by simultaneous increase in the intensity of energization of the brake coil. Therefore, during deceleration of the vehicle equipped according to the embodiment of our invention illustrated at the left of Figure 2, the intensity of wheel brake application will be progressively reduced, while the intensity of track brake application will be progressively increased.

As the actuation of the solenoids 10 and 10a is responsive to the rate of retardation of the vehicle, it will be understood that, when the rate of retardation exceeds a predetermined value, the intensity of application of the wheel brakes will be reduced in order to prevent wheel slippage, while at the same time the braking effect of the track brakes will be increased to exert a steadying effect on the vehicle and increase the wheel traction, by reason of the vertical component of the track braking force, exerted between the vehicle supported track brakes and the rails, to secure the ultimate smoothness in deceleration of the vehicle.

In Figures 3, 4 and 5, a substantially different arrangement is illustrated, and in these figures, the vehicle equipment illustrated at the right of Figure 3 is similarly arranged to that of Figure 4, save that, in Figure 4, the double rheostat and connections shown at the left of Figure 2 are substituted for the single rheostat illustrated at the right of Figure 3. The double rheostat thus provides means for progressively increasing the intensity of energization of the brake coil, while simultaneously progressively decreasing the intensity of application of the wheel brakes after the simultaneous initial application of the wheel and track brakes. Likewise, in the arrangement illustrated in Figure 5, the double rheostat and connections illustrated at the left of Figure 1 have been substituted for the single rheostat illustrated at the left of Figure 3. This substitution is made so that the intensity of applications of wheel and track brakes may be decreased progressively after the initial simultaneous application. The use of separate rheostats for controlling the wheel and track brakes provides means whereby the respective rates of such decrease may be varied.

In the arrangement shown at the right of Figure 3, the wire 19 which connects terminals of the solenoids of valves 5 and 6 is connected by means of the wire 18 to one side of the source of power 11. The opposite terminal of the valve 5 is connected by wire 39 to stationary contact 37. The opposite terminal of the valve 6 is connected by wire 38 to the contact 36. The contact 31 of the controller 32 is connected by wire 30 to the opposite side of the source of power 11. Therefore, when the contact 31 of the controller engages the contact 36, a circuit is completed from the source of power 11 through wire 30, contact 31, contact 36 and wire 38 to solenoid of valve 6, thence through wire 19 and wire 18 to the source of power 11. When the contact 31 engages the contact 37, a circuit is completed from the source of power 11 through wire 30, contact 31, contact 37, wire 39, solenoid of valve 5, wire 19, and wire 18 to the source of power 11. The fluid connections of the air engine 7, valves 5 and 6, reservoir 9, self-lapping valve device 3 and wheel brake cylinder 1 are the same as at the right of Figure 1, described above.

The circuit closer contact 26 is connected by the wire 29 with one terminal of the solenoid 10, while the other terminal of the solenoid 10 is connected to the wire 40 which leads to the wire 41 which is connected to one terminal of the winding of the self-lapping valve device 3. The circuit closer contact 25 is connected by the wire 27 to the wire 28 which leads to one side of the source of power 11.

The train wire branches are designated 141, 142, 143, 144, 145, 146 and 147 respectively. Similar train wire branches are provided for the adjacent vehicle at the left of Figure 3. The respective train wire branches 141 are adapted to be connected by jumper 141a; the respective train wire branches 142 are adapted to be connected by the jumper 142a; the respective branches 143 are adapted to be connected by the jumper 143a and likewise the branches 144 are adapted for connection by jumper 144a; branches 145 by jumper 145a; branches 146 by jumper 146a, and branches 147 by jumper 147a. In the respective vehicles, each train wire branch 146 is connected by the wire 139 with the wire 39 which connects the stationary contact 37 with a terminal of the valve 5. Likewise, the train branch wire 147 is connected by the wire 138 with the wire 38 which connects the controller contact 36 with a terminal of the valve 6. By this means, the controller circuits for the valves 5 and 6 of the respective cars are connected in parallel in such manner that energization of the solenoids of the valves 5 and 6 by the controller on one car to a predetermined intensity will be accompanied by like energization of the valves 5 and 6 of the adjacent car to a like intensity. By means of this connection, actuation of each controller mechanism in a train enables the actuated controller to control the biasing rheostat of all other vehicles in the trains.

The train wire branch 145 which may be designated the return branch is connected by wire 16 with the same terminal of the source of power 11, which has the wire 18 connected thereto. The return branch 145 has the return wire 49 connected thereto and extending to one terminal of the winding of the valve device 3; also connected to the return branch 145 is the wire 20 which leads from one terminal of the solenoid 21 which operates the switch plate 24 of the circuit closer. Adjacent the return branch 145 is the emergency branch 144 which is connected by the wire 148 with the emergency contact 149 of the manual brake switch 150. The brake switch 150 is provided with a lever 151 having thereon a handle 152 provided with a suitable contact which is connected by means of wire 153 with one side of the source of power 11. Also connected to the emergency branch 144 is the wire 50 which leads from the contacts 51 and 53 of the electric track trip switch 52.

The lever 56 of the track trip switch 52 is connected by the wire 55 to the wire 28. The emergency branch 144 is connected by the wire 154 to one terminal of the solenoid 155 of the emergency circuit closer 156 which has the other terminal of the solenoid 155 connected by wire 157 to the wire 20 which leads to the return branch 145. Associated with the solenoid 155 of the emergency circuit closer 156 is the armature 159 carrying a switch plate 158 which is adapted for engagement with contacts 160 and 162. The contact 160 is connected by wire 161 to the wire 55 and the contact 162 has a wire 163 connected thereto. The wire 163 is connected to the fixed resistance 164, which resistance is also connected to the wire 165 which is connected to the wire 42 which leads to the brake coil 43. The wire 47 leading from the brake coil 43 is connected by means of wire 166 with the wire 20 which leads to the return branch 145. Thus, if the lever 56 of the track trip switch 52 is engaged with either of contacts 51 or 53, a circuit is completed, which extends from the source of power 11 through wire 28, wire 55, switch 52, wire 50, emergency branch 144, wire 154, solenoid 155, wire 157, wire 20, return branch 145 and wire 16 to the other side of the source of power 11.

Energization of the solenoid 155 of the emergency circuit closer 156 causes the switch plate 158 to engage the contacts 160 and 162 to complete a circuit extending from the source of power 11, through wire 28, a part of wire 55, wire 161, contact 160, switch plate 158, contact 162, wire 163, resistance element 164, wire 165, wire 42, brake coil 43, wire 47, wire 166, wire 20, return branch 145 and wire 16 to the other side of the source of power 11. This causes energization of the brake coil 43 independently of the operation of the rheostat 10. The last-named circuit will be completed whenever the solenoid 155 is energized and the energization of this solenoid 155 may also be accomplished by engaging the lever 151 of the manual brake switch 150 with the emergency contact 149.

Upon engagement of the lever 151 with the emergency switch contact 149, a circuit is completed, which extends from the source of power 11, through wire 153, emergency contact 149, wire 148, emergency branch 144, wire 154, solenoid 155, wire 157, wire 20, a part of the return branch 145, and wire 16 to the other side of the source of power 11. Thus, immediately upon engagement of the lever 56 of the track trip switch 52 with either of the contacts 51 or 53 or engagement of the lever 151 of the manual brake switch 150 with the emergency contact 149 thereof, the solenoid 155 is energized to operate the emergency circuit closer 156 to cause energization of the contact brake coil 43 at ultimate intensity.

Where the track brake 44 is of the construction illustrated in Figure 1, energization of the coil 43 automatically causes application of the shoe 44 to the rail 46. However, in the form of brake illustrated at the right of Figure 3 (and in Figure 4), the shoe 44 is suspended by the springs 45 in the same manner as in Figure 1. However, the springs 45 suspend the shoe 44 at substantial distance from the rail 46, and for this reason, it is necessary to provide means for positioning the shoe more nearly adjacent the rail in order that energization thereof will cause application of the shoe 44 to the rail 46. This means comprises the lever 167 pivotally supported in any suitable manner at 168. The pivotal support of the lever 167 is at one end thereof and the other end thereof is provided with a suitable projection 169 which rests upon the top of the shoe 44.

Intermediate the ends of the lever 167 is the armature 170 which cooperates with the solenoid 171 in such manner that energization of the solenoid 171 will cause the lever 167 to be swung downwardly to properly position the shoe 44 closely adjacent the rail 46 in such manner that the rail will be disposed within the magnetic field of the shoe. One terminal of the solenoid 171 is connected by the wire 172 to the wire 42, while the other terminal of the solenoid 171 is connected by the wire 173 to the wire 47, which wires 42 and 47 are a part of the energizing circuit for the track brake coil 43. The solenoid 171 is, therefore, connected in parallel with the track brake coil 43. Energization of the track brake coil 43 is, therefore, accompanied by simultaneous energization of the solenoid 171. Therefore, upon closing of the emergency circuit closer 156, the brake coil 43 and solenoid 171 are simultaneously energized to ultimate intensity of application of the track brake shoe 44 to the rail 46. This emergency application of the track brake shoe is, as above explained, totally independent of the rheostat 10.

While energization of the solenoid 155 of the emergency circuit closer 156, as described above, causes immediate application of the track brake shoe 44 to the rail 46 which is energized at maximum intensity, the application of the track brake 44 to the rail 46 independently of the operation of the controller mechanism and the rheostat 10 is also accompanied by simultaneous emergency application of the wheel brakes at maximum intensity whenever the solenoid 155 of the emergency circuit controller 156 is energized to place the switch plate 158 in engagement with the contacts 160 and 162. This is accomplished by energizing the winding of the self-lapping valve device 3 to maximum intensity upon each energization of the solenoid 155 of the emergency circuit closer 156. The closing of the circuit closer 156 completes, for this purpose, a circuit which extends from one side of the source of power 11 through wire 28, wire 55, wire 161, contact 160, switch plate 158, contact 162, wire 163, fixed resistance 164 and wire 174 to the wire 41 which leads to one terminal of the winding of the self-lapping valve mechanism 3.

The circuit further extends through the winding of the valve device 3, through wire 49, through return branch 145, and wire 16 to the other side of the source of power 11. As this latter circuit is completed, whenever the emergency circuit closer 156 is closed, the simultaneous application of wheel brakes and track brakes to maximum intensity is accomplished either when the lever 56 of the track trip switch 52 is engaged with either of the contacts 51 or 53, or when the lever 151 of the manual switch 150 is engaged with the emergency contact 149 thereof. Due to the connection of the branches 145 of the respective vehicles by the jumpers 145a and the connection of the respective branches 144 by the jumpers 144a, emergency application of the brakes on one vehicle is accompanied by like emergency application of the brakes of each vehicle in the train.

Adjacent the emergency train wire branch 144 is the service train wire branch 143 which may be designated the service branch. The service branch 143 is connected by the wire 22 to one terminal of the solenoid 21 of the circuit closer, which solenoid 21 has its opposite terminal connected by the wire 20 to the return branch 145, as described above. The service branch 143 is connected by the wire 176 to the service contact 175 of the manual brake switch 150. When the lever 151 of the manual brake switch 150 is engaged with the service contact 175, a circuit is completed which extends from one side of the source of power 11 through wire 153, service contact 175, wire 176, service branch 143, wire 22, solenoid 21 of the circuit closer, wire 20, return branch 145, and wire 16 to the opposite side of the source of power 11. This closes the circuit closer by engagement of the switch plate 24 with the contacts 25 and 26.

When the circuit closer is closed by engagement of the switch plate 24 with contacts 25 and 26, a circuit is completed from one side of the source of power 11 through wire 28, wire 27, contact 25, switch plate 24, contact 26, and wire 29 to the rheostat 10 and thence through wire 40 and wire 41 to the winding of the valve device 3 and thence from the winding of the valve device 3 through wire 49, return branch 145 and wire 16 to the other side of the source of power 11. There is also completed a circuit which extends from the wire 41 through wire 174, wire 165, wire 42, track brake coil 43, wire 47, wire 166, wire 20, return branch 145 and wire 16 to the last-named side of the source of power. The latter or track brake energizing circuit is in parallel with the energizing circuit for the winding of the valve device 3. Therefore, upon closing the circuit closer through energization of the solenoid 21, the wheel and track brakes are applied and controlled through operation of the controller device 32.

Due to the above described connections provided by wire 138 connected from the wire 38 to branch 147, and by connection of wire 39 by wire 139 to branch 146, and the connection of the respective branches 146 and 147 of the respective cars, such service application of brakes responsive to control of controller device 32 is accompanied by like service application of the brakes of the other vehicles connected in the train responsive to the control of the controller device 32 on the vehicle having its brakes applied by service operation of the manual brake switch 150. As hereinafter described, means other than the manual brake switch 150 may be utilized for achievement of the same purpose.

For the purpose of causing emergency application of the track and wheel brakes of the connected vehicles of a train upon accidental parting of the train, the train wire branches 141 and 142 are provided on each vehicle. The respective train wire branches 142 are connected by the jumpers 142a and the respective train wire branches 141 are connected by the jumpers 141a. An end jumper 177 is provided for connecting the free ends of the branches 141 and 142 at the end of the train. Each vehicle is provided with a manually operable switch 180 having one contact 181 thereof connected by the wire 182 to the train wire branch 141. The other contact 183 of the switch 180 is connected by the wire 184 to the wire 28.

The train wire branch 142 is connected by the wire 185 with one terminal of the solenoid 186. The other terminal of this solenoid 186 is connected to the wire 20. The solenoid 186 is a part of the normally open relay switch 187 which has an armature 188 associated with the solenoid 186, which armature carries the switch plate 189. The relay switch 187 is also provided with contact 190 connected by wire 191 with wire 55 and with contact 192 connected by wire 193 to the wire 163 above the fixed resistance 164. Normally, when the switch 180 is closed, a circuit extends from one side of the source of power 11 through wire 28, wire 184, switch 180, wire 182, branch 141, end jumper 177, branch 142, wire 185, solenoid 186, wire 20, return branch 145, and wire 16 to the other side of the source of power 11. The solenoid 186 is then energized to retain the switch plate 189 out of engagement with the contacts 190 and 192. Upon interruption of this circuit, the switch plate 189 engages the contacts 190 and 192 to complete a circuit from one side of the source of power 11, through wire 28, wire 55, wire 191, contact 190, switch plate 189, contact 192, wire 193, resistance 164, wire 174, winding of the valve device 3, wire 49, return branch 145, and wire 16 to the opposite side of the source of power 11.

In parallel with this circuit is also a circuit extending from one side of the source of power 11, through wire 28, wire 55, wire 191, contact 190, switch plate 189, contact 192, wire 193, resistance 164, wire 165, wire 42, track brake coil 43, wire 47, wire 166, wire 20, return branch 145, and wire 16 to the other side of the source of power 11. Thus, upon closing of the relay switch 187, emergency application of the wheel and track brakes at full intensity is caused. Due to the connection of the train wire branches 141 by the jumpers 141a and the connection of the train wire branches 142 by the jumpers 142a and the connection of the right ends of the branches 141 and 142 by the end jumper 177, as shown in Figure 3, the lefthand switch 180 is closed to complete the energizing circuits of the solenoids 186 of the relay switches 187 to retain the relay switches 187 open. Upon parting of the loop comprising the connected branches 141, end jumper 177 and connected branches 142, the solenoids 186 will be immediately de-energized to cause emergency application at full intensity of track and wheel brakes on each vehicle.

Such emergency application of the brakes of the vehicles upon parting of this loop is, as may be understood, undesirable during shunting of the cars. For this purpose, means is provided for energizing the solenoids 186 independently of the completeness of the loop circuit provided by the connected branches 141 and 142. This means comprises the manual switch 194 provided on each vehicle having one contact connected by wires 195 to the branch 142 and the other contact connected by the wire 196 to the wire 28. When this switch 194 is manually closed, a circuit is completed, which extends from one side of the source of power 11 through wire 28, wire 196, switch 194, wire 195, train wire branch 142, wire 185, solenoid 186, wire 20, return branch 145, wire 16, to the other side of the source of power 11. This circuit retains the solenoid 186 energized whenever the switch 194 is manually closed. Thus, where, as shown in Figure 3, the vehicles are connected, the righthand vehicle may be disconnected by closing both switches 194 on the vehicle shown and inserting a jumper 177 at the right-hand end of the train wire branches 141 and 142 of the lefthand vehicle, shown in Figure 3, then releasing the lefthand switch 194, and closing the righthand switch 189 before releasing the righthand switch 194. When this is done, the loops are complete on the respective vehicles and the vehicle may be moved without operation of the brakes by this means, save upon destruction of the electrical continuity thereof within the vehicle itself.

The structure shown in Figure 4 is similar to that illustrated at the right of Figure 3, save for the substitution for the single rheostat 10 of the double rheostat construction and connections shown at the left of Figure 2. In the structure shown in Figure 4, the righthand section 10a of the rheostat has the wire 29a connected to the righthand tap of one resistance thereof and also to the wire 29, while the righthand tap of the other resistance thereof is connected directly to the wire 174. The other connections are the same as those illustrated at the right of Figure 3 and the operation is the same, save that, upon service application of the brakes, the wheel brakes are initially applied with ultimate intensity and the intensity of application is thereafter reduced, while the track brakes are initially applied at their minimum intensity and the intensity thereof progressively increased simultaneously with the progressive decrease of intensity of application of the wheel brakes. This will be clearly understood upon reference to the above description of the operation of the mechanism shown at the left of Figure 2.

The embodiment illustrated at the left of Figure 3 is broadly similar to that illustrated at the right of Figure 3, but, instead of the manual switch 150, we have provided a manually operable drum controller generally designated 197 and shown in developed form. Rotor 198 is provided with segments, generally designated 199, which are adapted, when the line S—S thereof is in alignment with the contacts 152 and 175, to connect these contacts to provide means of communication between one side of the source of power 11 and the train wire branch 143, and also adapted, when the line E—E thereof is placed in alignment with the contacts 152 and 149, to provide connection therebetween in such manner as to electrically connect one side of the source of power 11 and the train wire branch 144. The manual switch 194 is similar to that of a construction illustrated at the right of Figure 3 and is similarly connected. The connections of the controller circuit are the same as that illustrated at the right of Figure 3.

The wire 28 is connected by the wire 184 with one contact 183 of the switch 180 which has the other contact 181 thereof connected by the wire 182 to the train wire branch 141. The wire 28 is also connected by the wire 55 with the contact 53 of the air engine operated track trip switch which is similar to that of Figure 2. The other contact 51 of the track trip switch is connected by the wire 50 to the train wire branch 144. The return branch 145 is connected by the wire 16 to one side of the source of power 11. The wires 30 and 200 connect the source of power 11 to the contact 25 of the circuit closer which has the other contact 26 thereof connected by means of wire 29 with one tap of one resistance of the rheostat 10. The corresponding tap of the other resistance of the rheostat 10 is connected by wire 40 to wire 41 which leads to one terminal of the winding of the valve device 3. The other terminal of the winding of the valve device is connected by wire 49 with the wire 20 which leads to the return branch 145. The wire 40 is also connected by the wire 42a to the wire 165 below the fixed resistance 164. The wire 165 is also connected to the wire 42 which is connected to one terminal of the coil 43 of the brake shoe 44. The opposite terminal of the coil 43 is connected by the wire 47 to the wire 20 which, as described, leads to the return branch 145.

The contact 162 of the emergency circuit closer 156 is connected by means of wire 163 with the fixed resistance 164 and with the contact 192 of the relay switch 187. The contact 160 of the emergency circuit closer 156 is connected by means of wire 161 to the wire 201 which is connected to the wire 200. The contact 190 of the relay switch 187 is connected by means of wire 191 and wire 202 with the wire 201. One terminal of the rheostat 21 is connected to the wire 20 and the other is connected to the branch 143 by means of wire 22. One terminal of the solenoid 155 is connected by wire 157 to the wire 20 and the other is connected by means of wire 154 to the branch 144. One terminal of the solenoid 186 is connected to the wire 20 and the other terminal is connected by the wire 185 to the branch 142. The valve of the track trip switch is connected by means of pipe 118 to the pipe 4 and the pipe 118 is connected by means of pipe 203 with the lower chamber of the self-lapping valve device 3a which is similar to the valve device 3.

The pressure chamber of the valve device 3a is connected to pipe 131 which leads to the cylinder 127 of the air engine 126 which is similar to the air engine brake support means illustrated at the right of Figure 2 and which has the brake shoe 44 supported on the stem 130 thereof. One terminal of the winding of the valve device 3a is connected by the wire 204 to the wire 42 and the other terminal of the winding of the valve device 3a is connected by wire 205 to the wire 47. The energizing circuits of the winding of the valve device 3a and the coil 43 of the track brake are thus in parallel.

The intensity of energization of the winding of the valve 3a controls the flow of fluid into the cylinder 127 of the air engine 126 whereby to control the rate of movement of the stem 130 which supports the shoe 44 upon completion of the energizing circuit of the coil 43 of the brake shoe 44. This controls the time required for application of the shoe 44 to the rail 46. Also, as will be readily understood, when the energized shoe 44, in moving downwardly under the influence of the air engine 126, reaches a position sufficiently adjacent the rail 46 to place the rail within the magnetic field of the shoe, further downward movement, due to energization, is opposed by a force which is proportional to the pressure in the cylinder 127 because, where the magnetically created force is greater than the difference between the fluid force and spring force, the magnetic force tends to create a partial vacuum in the cylinder 127 which is relieved at a rate proportional to the flow of fluid through the valve device 3a which, of course, depends upon the degree of intensity of energization of the winding thereof which, in turn, is controlled by the rheostat 10 simultaneously with the control of the intensity of energization of the coil 43 of the brake shoe 44. The valve device 3a, therefore, provides means for controlling the quickness of application of the brake shoe 44 to the rail 46, the rate of movement of the shoe being substantially directly proportional to the rate of flow of fluid through the valve device 3a which, in turn, is dependent upon the degree of intensity of energization of the coil 43 of the brake shoe 44, which coil has its energizing circuit in parallel with the energizing circuit of the winding of the valve device 3a.

Upon emergency application of the brake through manual emergency operation of the controller 197 or through operation of the pneumatic track trip by the track trip device 57, the coil of the valve device 3a is energized to its ultimate intensity, whereby the flow therethrough of fluid to the cylinder 127 occurs at the ultimate rate and the ultimate quickness of application of the brake shoe 44 is thereby secured.

As above described, due to the connection, in the train, of the train wire branches 147 by the jumpers 147a and the connection of the respective branches 147 by means of wires 138 with the respective wires 38, and due to the connection, in the train, of the train branch wires 146 by the jumpers 146a and their connection by means of wire 139 with the wire 39 of the respective vehicles, the retardation controller device 32 of either car may control the rheostats of all. Also, as pointed out above, the solenoid 186 is normally energized to prevent completion of the circuit between relay switch terminals 190 and 192. Upon actuation of the track trip device to place the switch plate 115 in engagement with the contacts 51 and 53, a circuit is completed from one side of the source of power 11 through wire 28, wire 55, contact 53, switch plate 115, contact 51 and wire 50, emergency branch 144, wire 154, solenoid 155, wire 20, return branch 145 and wire 16 to the other side of the source of power 11. This causes the switch plate 158 of the emergency circuit closer 156 to engage the contacts 160 and 162. This completes a circuit from one side of the source of power 11 through wire 30, wire 200, wire 201, wire 161, contact 160, switch plate 158, contact 162, wire 163, resistance element 164, wire 165, wire 42, track brake coil 43, wire 47, wire 20, return branch 145, wire 16, to the opposite side of the source of power 11.

A circuit for energizing the winding of the valve device 3 is also completed, which extends from the resistance element 164, through wire 42a, wire 41, winding of the valve device 3 and wire 49 to energized wire 20. A circuit is also completed from energized wire 165 through wire 204, winding of the valve device 3a and wire 205 to energized wire 20. The windings of the valve devices 3 and 3a and the coil 43 of the track brake are, therefore, energized to the ultimate degree of intensity. This emergency energization of the windings of the two valve devices and of the coil 43 of the track brake will occur each time the emergency circuit closer 156 is closed by energization of the solenoid 155 thereof. Therefore, upon actuation of the controller 197 to place the line E—E in alignment with the contacts 152, 175 and 149, the segment 199 will electrically connect the contacts 152 and 149 to complete a circuit from one side of the source of power 11 through wire 153, contact 152, segment 199, contact 149, wire 148, branch 144, wire 154, solenoid 155, wire 20, return branch 145 and wire 16 to the other side of the source of power 11.

As above described, upon parting of the loop consisting of the connected train wire branches 141 and 142 and end jumper 177, the solenoid 186 will be deenergized to cause the switch plate 189 to electrically connect the contacts 190 and 192 of the relay switch 187. This will cause completion of a circuit extending from one side of the source of power 11 through wire 30, wire 200, wire 201, wire 202, contact 190, switch plate 139, contact 192, wire 123, resistance element 164, wire 165, wire 42, brake coil 43, wire 47, wire 20, return branch 145 and wire 16 to the opposite side of the source of power 11. The energizing circuits for the windings of the valve devices 3 and 3a, which are in parallel with the energizing circuit of the brake coil 43, will be simultaneously energized and the energization of the windings of the valve devices 3 and 3a and of the coil 43 of the track brake will be of ultimate intensity. Such last described emergency brake application may, at any time, be prevented by closing the manual switches 194 on the respective vehicles.

The brakes, both wheel and track of the respective vehicles, may likewise be immediately released after such emergency application by manually closing the switch 194 on that vehicle because, upon such closing of the switch, a circuit for energizing the solenoid 186 will then be completed, which circuit extends from one side of the source of power 11 through a portion of wire 28, through wire 196 and switch 194, through wire 195, through wire 142, wire 185, solenoid 186, wire 20, return branch 145, and wire 16 to the other side of the source of power 11.

Service application of the structure illustrated at the left of Figure 3 is accomplished by so manually operating the controller 197 as to place the line S—S in substantial alignment with the contacts 152, 175 and 149. The segment 199 will electrically connect the contacts 152 and 175 to complete the service circuit which extends from one side of the source of power 11, through wire 153, contact 152, segment 199, contact 175, wire 176, service branch 144, wire 22, solenoid 21, wire 20, return branch 145 and wire 16 to the opposite side of the source of power 11. This energizes the solenoid 21 of the circuit closer to engage the switch plate 24 with the contacts 25 and 26 of the circuit closer. This completes a circuit from one side of the source of power 11, through wire 30, wire 200, contact 25, switch plate 24, contact 26, wire 29, through rheostat 10, wire 40, wire 41, winding of the valve device 3, wire 49, wire 20, return branch 145 and wire 16 to the other side of the source of power 11.

A circuit will also be completed from the energized wire 40 through wire 42a, wire 165, wire 42, track brake coil 43, wire 47, to energized wire 20. This circuit is in parallel with the energizing circuit for the valve device 3. Likewise, a circuit will be completed from energized wire 42 through wire 204, through winding of the valve device 3a and through wire 205 to energized wire 20. Thus, the windings of the valve devices 3 and 3a and the coil 43 of the track brake will be initially energized to ultimate intensity, and the intensity of energization thereof will be thereafter controlled by the insertion of resistance between wires 29 and 40 by the rheostat 10 through operation of the air engine 7 which is controlled by the retardation controller device 32.

The structure illustrated in Figure 5 is similar to that illustrated in Figure 3, the only difference being that rheostats 10 and 10a in tandem are substituted for the single rheostat 10 used to control the energization of the valve devices 3 and 3a and the intensity of energization of the coil 43 of the track brake. The details of the tandem rheostat illustrated in Figure 5 are the same as those illustrated at the left of Figure 2. The wire 29 has one end thereof connected to the contact 26 of the circuit closer and the other end thereof connected to the lefthand tap of one resistance of the rheostat 10. The corresponding tap of the other resistance of the rheostat 10 is connected to the wire 40 which leads to one terminal of the winding of the valve device 3, the other terminal of which winding is connected by the wire 49 to the wire 20. The wire 29a has one end thereof connected to the wire 29 and the other end thereof connected to the lefthand tap of one resistance of the rheostat 10a. The corresponding tap of the other resistance of the rheostat 10a is connected by means of the wire 42a with the wire 165 below the resistance element 164. The values of the resistances of the rheostats 10 and 10a may be varied, as described above in the description of the structure illustrated at the left of Figure 1.

Upon manual actuation of the controller 197, as described above, to energize the solenoid 21 of the circuit closer, a circuit will be completed from one side of the source of power 11 through wire 30, wire 200, contact 25, switch plate 24, contact 26, wire 29 to the lefthand tap of one resistance of the rheostat 10 and thence through the rheostat to the corresponding tap of the other resistance of the rheostat 10, through wire 40 to one terminal of the winding of the valve device 3, through wire 49, wire 20, return branch 145 and wire 16 to the opposite side of the source of power 11. A second circuit extends from the energized wire 29, through wire 29a to one tap of one resistance of rheostat 10a, through the rheostat 10a from the corresponding opposite tap, through wire 42a, through wire 165, wire 42, track brake coil 43, wire 47, wire 166, to energized wire 20. Simultaneously, a parallel circuit will be completed from the energized wire 42, through wire 204, through winding of the valve device 3a and through wire 205 to energized wire 166.

Upon movement of the piston rod 74 to the right under the control of the retardation controller device 32, resistance will be progressively inserted between wires 29 and 40 and between wires 29a and 42a to diminish the intensity of energization of valve devices 3 and 3a and the intensity of energization of brake shoe 44. The rheostat 10 controls the intensity of application of the wheel brakes through variation in the intensity of energization of the winding of the valve device 3, while simultaneously the intensity of energization of the brake coil 43 and the rate of flow through the valve device 3a to position the shoe is controlled by the rheostat 10a.

It is to be noted that, in all constructions wherein the fixed resistance 164 is utilized, it is so disposed as not to be included in any energizing circuit which includes the rheostat 10 or where the tandem arrangement is used, the rheostat 10 or the rheostat 10a. The fixed resistance 164 is, however, so disposed as to be included in the emergency energizing circuit of the brake coil 43 as well as the emergency energizing circuit for the valve device 3 and where two valve devices are used in the energizing circuits of each of the valve devices 3 and 3a. The purpose of this fixed resistance 164 is to prevent damage to the windings of the valve devices and to the coil 43 due to the fact that, in the emergency circuits, no resistance of the rheostats is included.

Furthermore, it is contemplated that the value of the respective resistances in the train system may be varied for the sake of balance and in order to secure uniform application in the respective vehicles of the train. It is contemplated that, where desired, any suitable known variable resistance element may be substituted for the fixed resistance 164, the adjustability of such resistance may be utilized for the purpose of balancing the emergency braking circuits of the respective cars, as described above.

It is, of course, to be understood that it is preferable that each of the vehicles in a train be uniformly equipped according to the principles of our invention. For instance, while we have illustrated in Figure 1 two embodiments of our invention as connected in a train, it is preferred, though not absolutely necessary, that each vehicle be identically equipped.

Likewise, while we have shown but one track brake in the equipment of each vehicle, it is, of course, to be understood that a plurality of such brakes will be provided for each vehicle, which practice is conventional.

Likewise, while we have illustrated and described two-wire circuits for the various mechanisms, and while such two-wire circuits are preferred in order to avoid conflict with conventional railroad signalling systems, it is contemplated that, where desired, single wire circuits may be substituted for the double wire circuits by the substitution for the return wires of the various circuits, suitably located grounds.

It is preferred by us, in the practice of our invention, to secure utmost rapidity of brake application responsive to any of the devices provided by us for this purpose. It is, therefore, proposed that all electrical devices, means and circuits shall be designed and constructed to eliminate or minimize all electrostatic and electromagnetic induction. We, therefore, prefer to use double wire circuits and eliminate the necessity for grounds and/or track return circuits. We also propose to so design the armature and core of all the electromagnetic devices as to secure the quickest possible action, such result being preferably secured by the use of the magnetic shunt principle.

Furthermore, while it has recently become a tendency to deliberately add to the inductance of magnetic track brake shoes in order to delay the energization thereof, it is proposed by us to reduce the inductance of the track brake shoes to a minimum in order to secure the utmost rapidity of energization and application. It is further preferred by us that all wires and cables utilized in the electrical circuits be composed of suitably twisted fine strands and that the circuits be grouped in pairs and suitably disposed.

In the constructions illustrated in Figures 1 and 2, the rheostats are operated to control the brakes, both during service and during emergency operation. Simultaneous emergency application of both wheel and track brakes of all connected cars is achieved by operation of the track trip switch on any one car. Simultaneous service application of both wheel and track brakes of all connected cars is achieved by operation of the manual switch 13 on any car. The track trip switches are either electrical (Figure 1, right) or fluid engine operated (Figure 1, left, Figure 2). The track brakes are positioned either by energization alone (Figure 1, Figure 2 left), by air engine (Figure 2, right, Figure 3 left, Figure 5), or by a solenoid connected in the energizing circuit of the brake coil 43 (Figure 3 right, Figure 4).

In Figure 2 (right), the self-lapping valve device 3 controls the rate of movement in positioning the track brake.

In Figures 1 and 2 (left), energization of the winding of the self-lapping valve device 3 and of the track brake coil 43 is controlled by separate simultaneously operable rheostats having common air engine operating means.

In Figure 1 (left), intensity of application of both wheel and track brakes is progressively diminished by the retardation controller device 32.

In Figure 2 (left), intensity of application of the wheel brakes is progressively decreased, while intensity of application of the track brakes is simultaneously progressively increased.

In Figures 3, 4 and 5, as in Figures 1 and 2, service application of the wheel and track brakes on one vehicle of the train is accompanied by service application of the brakes on all vehicles of the train.

In Figures 3, 4 and 5, means (146, 147, 146a, 147a) is provided for making the brake control means on all vehicles connected in a train responsive to the retardation controller device on one vehicle of the train.

Means (including the loop train wire 141, 142, 141a, 142a, 177) for causing emergency application of all train brakes upon parting of vehicles of the train is also provided.

Means (switches 194 and 180 on each car) for making the last-named means inoperative to cause brake application during switching and shunting of the train vehicles is also provided.

Emergency brake application at maximum intensity, independent of the control means, is achieved.

The emergency application of both wheel and track brakes (independently of the retardation controller) is secured either by parting of the connection of vehicles connected by the loop train line, by operation of the track trip switch, or by manual operation of the switch 150 or controller 197.

Means is provided, Figure 3 left, Figure 5, for controlling the positioning of the track brake shoe in predetermined manner.

In Figure 3 left and Figure 5, the self-lapping valve device 3 controls the intensity of application of the wheel brakes, the intensity of energization of the track brakes and the intensity of energization of the self-lapping valve device 3a which determines the rate of movement in positioning the track brakes, i. e. the time required for application of the track brakes after application of the wheel brakes. In other words, the rheostat 10 is under the control of retardation controller device 32; the valve device 3 and track brake energizing circuit are under the control of rheostat 10; the valve device 3a is under the control of the track brake energizing circuit; and the brake positioning means is under the control of the valve device 3a.

In the construction at the right of Figure 3, the single rheostat 10 controls the intensity of energization of the winding of the self-lapping valve device 3 and also the intensity of energization of the track brake coil 43 and of the solenoid 171.

In the construction of Figure 4, the rheostat 10 controls the intensity of energization of the self-lapping valve device 3, while the rheostat 10a controls the intensity of energization of the track brake coil 43 and the solenoid 171. The circuits of the coil 43 and of the solenoid 171 are in parallel in each of the constructions of Figure 4 and Figure 3, right. While in Figure 5, decrease in the intensity of energization of the valve device 3 is accompanied by decrease of intensity of energization of the valve device 3a, and of the track brake coil 43. In Figure 4, decrease in intensity of energization of the valve device 3 is accompanied by increase in intensity of energization of the track brake coil 43 and the solenoid 171. It is, of course, to be understood that the wires 29a and 42a of Figure 5 may be attached to other taps of the resistances of the rheostat 10a, as in Figure 4, and that the wires 29a and 174 may be attached to other taps of the resistances of the rheostat 10a in the same manner as is followed in Figure 5.

It is to be particularly noted that the principles of our invention may be applied to various known constructions of braking mechanism, to which they are additive and that the cost of application of the principles of our invention to such known braking systems is by no means so great as where it is necessary to substantially modify the known braking systems and install complicated systems of air lines and complicated valve structures. A particular disadvantage of the use of such air lines and pneumatic control mechanism consists in the difficulty of providing satisfactory connection between the pneumatic conduits of adjacent vehicles in a train. Where such systems are used, the coupling and uncoupling of such lines is extremely difficult and requires a substantial amount of time, and the cost of such pneumatic conduits and connections is prohibitive. In addition to this, the connections between the conduits of the respective vehicles have but short life due to the necessary flexibility of connection between the respective vehicles in the train, which causes great wear upon flexible pneumatic connections.

By the utilization of the principles of our invention, the former necessity for manual adjustment of the intensity of brake application is entirely obviated, all control of the intensity of brake application being accomplished through the automatic operation of the retardation controller 32 which properly adjusts the intensity of brake application during deceleration of the vehicle or train in such manner that the force of brake application is progressively reduced at a rate proportional to the increase in co-efficient of brake friction due to decrease of the speed of the vehicle. This adjustment is accomplished in such manner as to totally avoid the locking of the vehicle wheels and consequent slippage between the wheels and the track. The intensity of energization of the track brakes, which are applied simultaneously with the wheel brakes at full intensity, is thereafter reduced at a rate proportional to the reduction of the intensity of wheel brake application or applied after the application of the wheel brakes (Figure 5, Figure 3, left), or the wheel brakes may be initially applied at full intensity, which intensity is thereafter reduced; while the track brakes are applied either simultaneously with or after the application of the wheel brakes, while energized at low intensity which intensity is thereafter increased during decrease of the intensity of application of the wheel brakes.

Due to the fact that the track brakes are unaffected by certain conditions of operation, which materially affect the operative characteristics of the wheel brakes, this latter mode of operation is, in some cases, preferable. The track brakes are less susceptible, in operation, to the effects of water, oil or ice on the rail than are the wheel brakes, and the track brakes operate directly upon the rails irrespective of the existence or non-existence of traction between the wheels and the rails, while the wheel brakes depend, for their braking efficiency, upon traction between the vehicle wheels and the rails.

Furthermore, the track brakes, upon application apply downward pressure to the vehicle trucks to force the wheels against the rails whereby to increase traction therebetween and therefore increase, in this manner, the efficiency of wheel braking by decreasing slippage between wheels and rails.

It will be understood that the above-described structure is merely illustrative of the manner in which the principles of our invention may be utilized and that we desire to comprehend within our invention such modifications as come within the scope of the claims and the invention.

Having thus fully described our invention, what we claim as new and desire to secure by Letters Patent is:

1. In a railway vehicle having wheel brakes and track brakes, common means for first applying said wheel brakes and then applying said track brakes at predetermined intensity, and means for progressively diminishing the intensity of wheel brake application and for simultaneously increasing the intensity of track brake application at rates proportional to the rate of change in speed of the vehicle during deceleration thereof.

2. In a train comprising connected railway vehicles having wheel brakes and track brakes, means on each of said vehicles operable to simultaneously apply the wheel and track brakes of all vehicles in the train at predetermined intensity, and means on each vehicle operable to adjust the intensity of application of all of said brakes at a rate proportional to the rate of retardation of the vehicle.

3. In a train comprising a plurality of connected railway vehicles having wheel brakes and track brakes, means on each vehicle operable to apply the wheel and track brakes of all vehicles at maximum intensity, and means including a gravity and inertia responsive controller device on each vehicle for automatically adjusting the intensity of application of said brakes progressively at a rate proportional to the rate of increase of co-efficient of braking friction during deceleration of said train.

4. In a train comprising connected railway vehicles having wheel brakes and track brakes, means on each vehicle for simultaneously applying the wheel and track brakes of all vehicles in the train at predetermined intensity, and means on one of said vehicles for automatically diminishing the intensity of wheel brake application and simultaneously increasing the intensity of track brake application on all said vehicles at rates proportional to the rate of change in the speed of the vehicle during deceleration.

5. In a method of braking for railway vehicles having wheel and track brakes, applying the wheel brakes, applying the track brakes at a predetermined interval thereafter, and progressively diminishing the intensity of application of the wheel brakes while increasing the intensity of application of the track brakes at a rate proportional to the rate of increase of braking friction.

6. In a method of braking for railway vehicles having wheel and track brakes, applying a maximum intensity the wheel brakes, applying at maximum intensity the track brakes at a predetermined interval after the application of the wheel brakes, and progressively diminishing the intensity of application of the wheel brakes at a rate proportional to the rate of increase of braking co-efficient while diminishing the intensity of application of the track brakes at a different rate.

7. In a method of braking for railway vehicles having wheel and track brakes, simultaneously applying the wheel and track brakes at predetermined intensity, progressively diminishing the intensity of application of said wheel brakes at a rate proportional to the rate of increase of co-efficient of braking friction, and progressively increasing the intensity of application of said track brakes at a rate different from the rate of decrease of intensity of the application of the wheel brakes.

8. In a method of braking for railway trains comprising connected vehicles having wheel and track brakes, simultaneously applying the wheel and track brakes of all vehicles in the train at maximum intensity, progressively diminishing the intensity of application of the wheel brakes of all vehicles at a rate proportional to the rate of increase of braking co-efficient in the brakes of one vehicle, and simultaneously increasing the intensity of application of the track brakes of all vehicles at a rate proportional to the rate of increase of braking co-efficient in said vehicle.

9. In a train comprising connected railway vehicles having wheel and track brakes, means on each of said vehicles for simultaneously applying all train wheel brakes, and means on each of said vehicles for simultaneously controlling the intensity of application of all said brakes at a rate proportional to the rate of increase of co-efficient of braking friction.

10. In a train comprising connected railway vehicles having wheel and track brakes, means on one vehicle for simultaneously applying all train brakes, and means on said vehicle for diminishing the intensity of application of all train wheel brakes while increasing the intensity of application of all train track brakes at rates proportional to the rate of increase of co-efficient of braking friction during deceleration of the train.

11. In a train comprising connected railway vehicles having wheel and track brakes, means on each vehicle for applying all train wheel brakes and thereafter applying all train track brakes, and inertia responsive means on each of said vehicles each operative to control the intensity of application of all said brakes at uniform rates proportional to the speed of deceleration of the train.

12. In a train comprising connected railway vehicles having wheel and track brakes and inertia responsive means for controlling the intensity of application thereof, means on each vehicle operative to cause service application of all said train brakes under control of said intensity controlling means, and means on each vehicle operative to cause emergency application of said brakes independent of the control of said inertia responsive means.

13. In a train comprising connected railway vehicles having wheel and track brakes and inertia responsive means for controlling the intensity of application thereof, means on each vehicle operative to cause service application of all said train brakes under control of said intensity controlling means, and means on each vehicle operative to cause emergency application of said brakes independent of the control of said inertia responsive means, said last-named means including a manually operable electric switch.

14. In a train comprising connected railway vehicles having wheel and track brakes and inertia responsive means for controlling the intensity of application thereof, means operative to cause application of all said train brakes under control of said intensity controlling means, and means automatically operative upon occurrence of vehicle separation in the train to cause emergency application of said train brakes independently of said intensity controlling means.

15. In a train comprising connected railway vehicles having wheel and track brakes and inertia responsive means for controlling the intensity of application thereof, means operative to cause application of all said train brakes under control of said intensity controlling means, and means automatically operative upon occurrence of vehicle separation in the train to cause emergency application of said train brakes independently of said intensity controlling means, said last-named means including a loop train line circuit adapted upon being interrupted by vehicle separation to cause emergency train brake application.

16. In a train comprising connected railway vehicles having wheel and track brakes and inertia responsive means for controlling the intensity of application thereof, means for causing service application of all train brakes under the control of said intensity controlling means, means automatically operative upon occurrence of vehicle separation in the train to cause emergency application of said train brakes independently of said intensity controlling means, and manually operable means on each vehicle for making said last-named emergency brake applying means inoperative during the removal of a vehicle from the train.

17. In a train comprising connected railway vehicles having wheel and track brakes and inertia responsive means for controlling the intensity of application thereof, means for causing service application of all said train brakes under control of said intensity controlling means, means including a loop train line circuit adapted upon being interrupted by vehicle separation to cause emergency application of all said train brakes independently of said intensity controlling means, and manually operable means on each vehicle adapted when operated to make said last-named means inoperative to apply the brakes of that vehicle.

18. In a railway vehicle having wheel brakes and a track brake, common means for causing application of said wheel brakes and positioning of said track brake for energization, a circuit for energizing said track brake, and common means including a pair of rheostats in tandem operated by a common air engine, for controlling the intensity of energization of said track brake through said circuit, at one rate, and the speed of positioning of said track brake and the intensity of application of said wheel brakes through said common means, at a different rate.

19. In a railway vehicle having wheel brakes and a track brake, common means for causing application of said wheel brakes and positioning of said track brake for energization, a circuit for energizing said track brake, and common means including a pair of rheostats in tandem operated by a common air engine, for controlling the intensity of energization of said track brake through said circuit, at one rate, and the speed of positioning of said track brake and the intensity of application of said wheel brakes through said common means, at a different rate, one of said rheostats being connected with the track brake energizing circuit for control thereof at one rate and the other of said rheostats being connected to said common means for controlling said common means at a different rate.

20. In a train, a plurality of connected vehicles each having a brake system, the brake systems of each of said vehicles being electrically connected for simultaneous operation, each of said brake systems including a brake cylinder for applying the wheel brakes, a track brake, a circuit for energizing said track brake, a self-lapping magnet valve device for controlling the supply of fluid under pressure to said brake cylinder, a circuit for supplying current to operate said magnet valve device, a rheostat in said circuit adapted to control both said energizing circuits, means for biasing said rheostat to a minimum position, a retardation controller device, and means governed by operation of said retardation controller device for operating said rheostat from said minimum position toward a maximum position.

21. In a railway vehicle, a wheel brake, an electropneumatic self-lapping valve device for controlling the intensity of application of said wheel brake, a circuit for energizing said valve device, a track brake, a circuit for energizing said track brake for causing application thereof, and common means for controlling the intensity of application of said wheel brake and said track brake by controlling the strength of said energizing circuits.

22. In a railway vehicle, a wheel brake, an electropneumatic self-lapping valve device for controlling the intensity of application of said wheel brake, a circuit for energizing said valve device, a track brake, a circuit for energizing said track brake for causing application thereof, and common means for controlling the intensity of application of said wheel brake and said track brake by controlling the strength of said energizing circuits, said last-named means comprising a rheostat connected to each of said energizing circuits.

23. In a railway vehicle, a wheel brake, an electropneumatic self-lapping valve device for controlling the intensity of application of said wheel brake, a circuit for energizing said valve device, a track brake, a circuit for energizing said track brake for causing application thereof, and means for simultaneously controlling the intensity of application of said wheel brake and said track brake by controlling the strength of said energizing circuits, said last-named means comprising a pair of rheostats having common operating means.

24. In a railway vehicle, a wheel brake, an electropneumatic self-lapping valve device for controlling the intensity of application of said wheel brake, a circuit for energizing said valve device, a track brake, a circuit for energizing said track brake for causing application thereof, and means for simultaneously controlling the intensity of application of said wheel brake and said track brake at different rates by controlling the strength of said energizing circuits, said last-named means comprising a pair of rheostats having common operating means and provided with tapped resistances, the resistance value between taps in one rheostat being greater than the resistance value between taps in the other rheostat whereby during operation of said rheostats, the rate of variation of one of said energizing circuits is greater than the rate of variation of said other energizing circuit.

THEODORE H. SCHOEPF.
DAVID M. RITCHIE.